May 6, 1958 H. A. RAHMEL ET AL 2,833,859
SYSTEM FOR DETERMINING LISTENING HABITS
OF WAVE SIGNAL RECEIVER USERS
Filed March 16, 1956 7 Sheets-Sheet 1

INVENTORS
HENRY A. RAHMEL,
ROBERT L. FREEMAN,
BY CHARLES H. CURREY AND
DARREL W. HOLBROOK

ATTORNEYS.

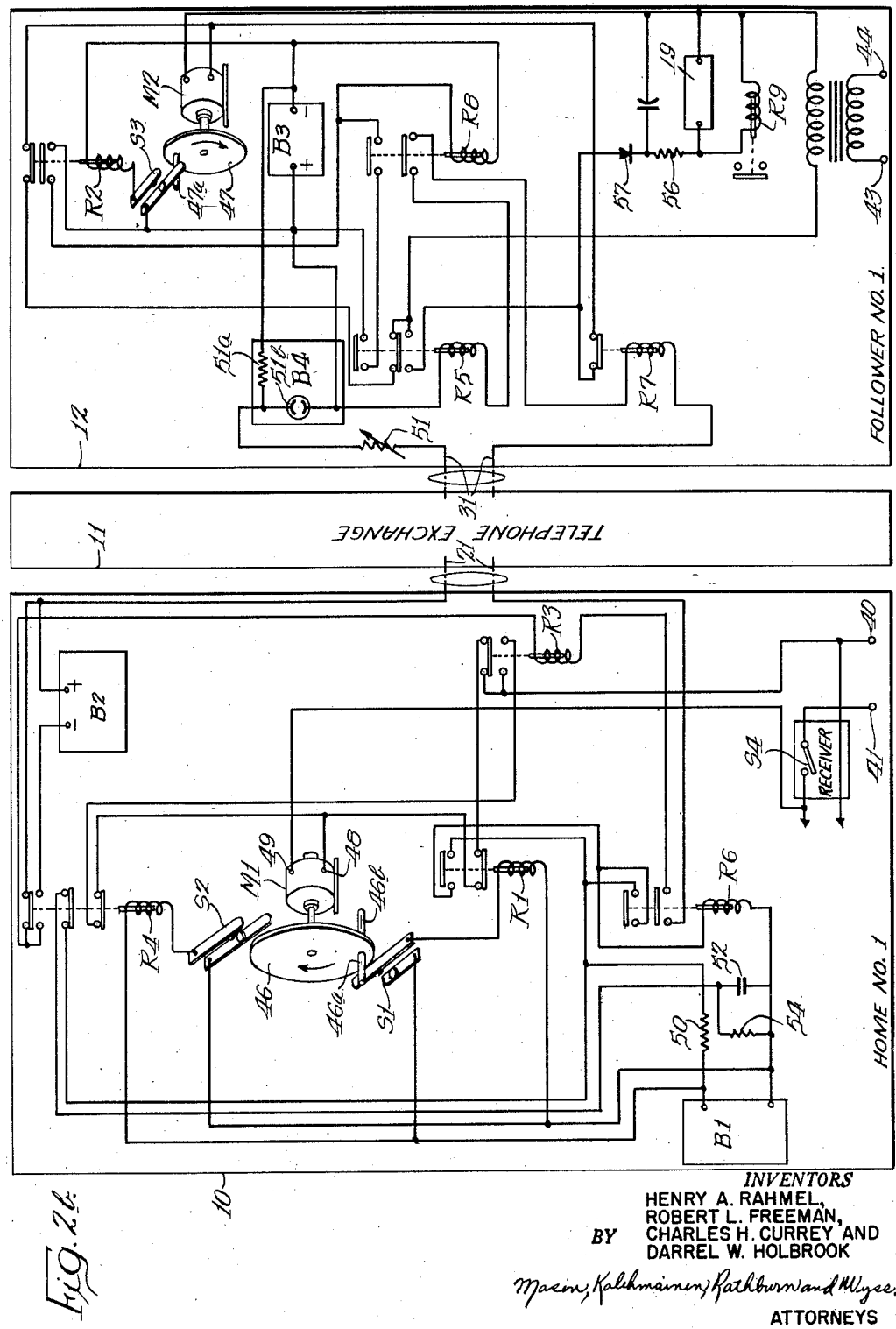

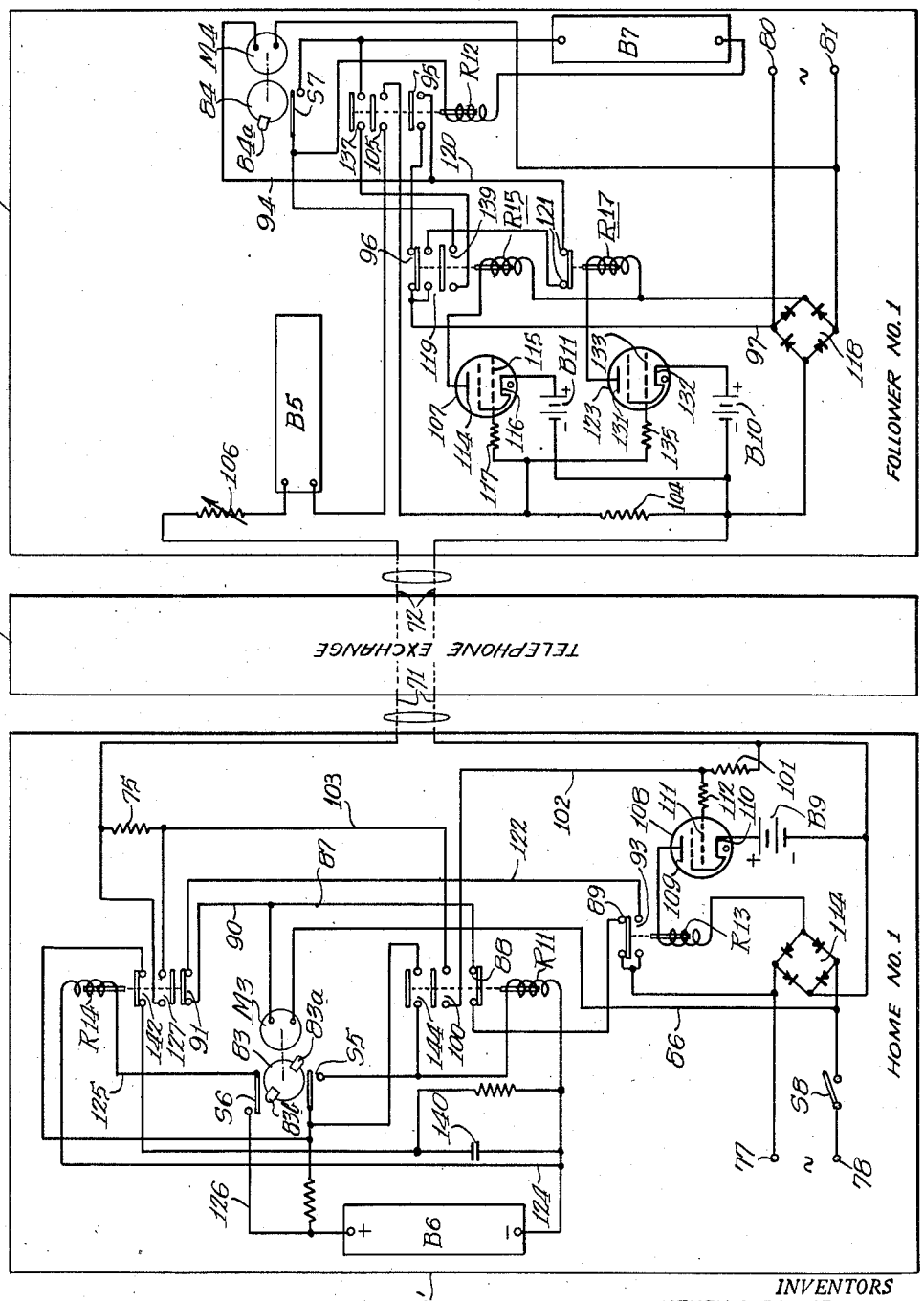

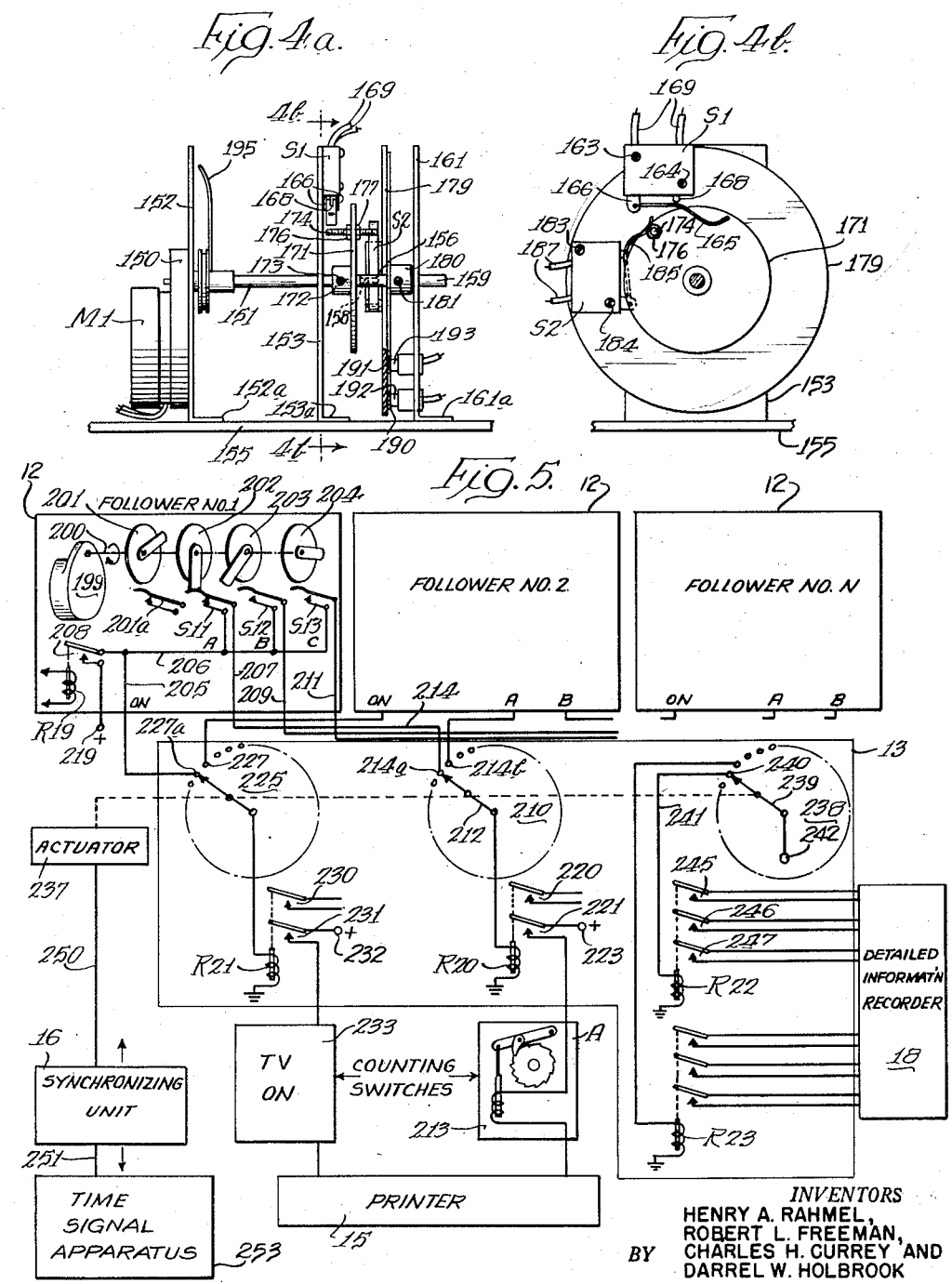

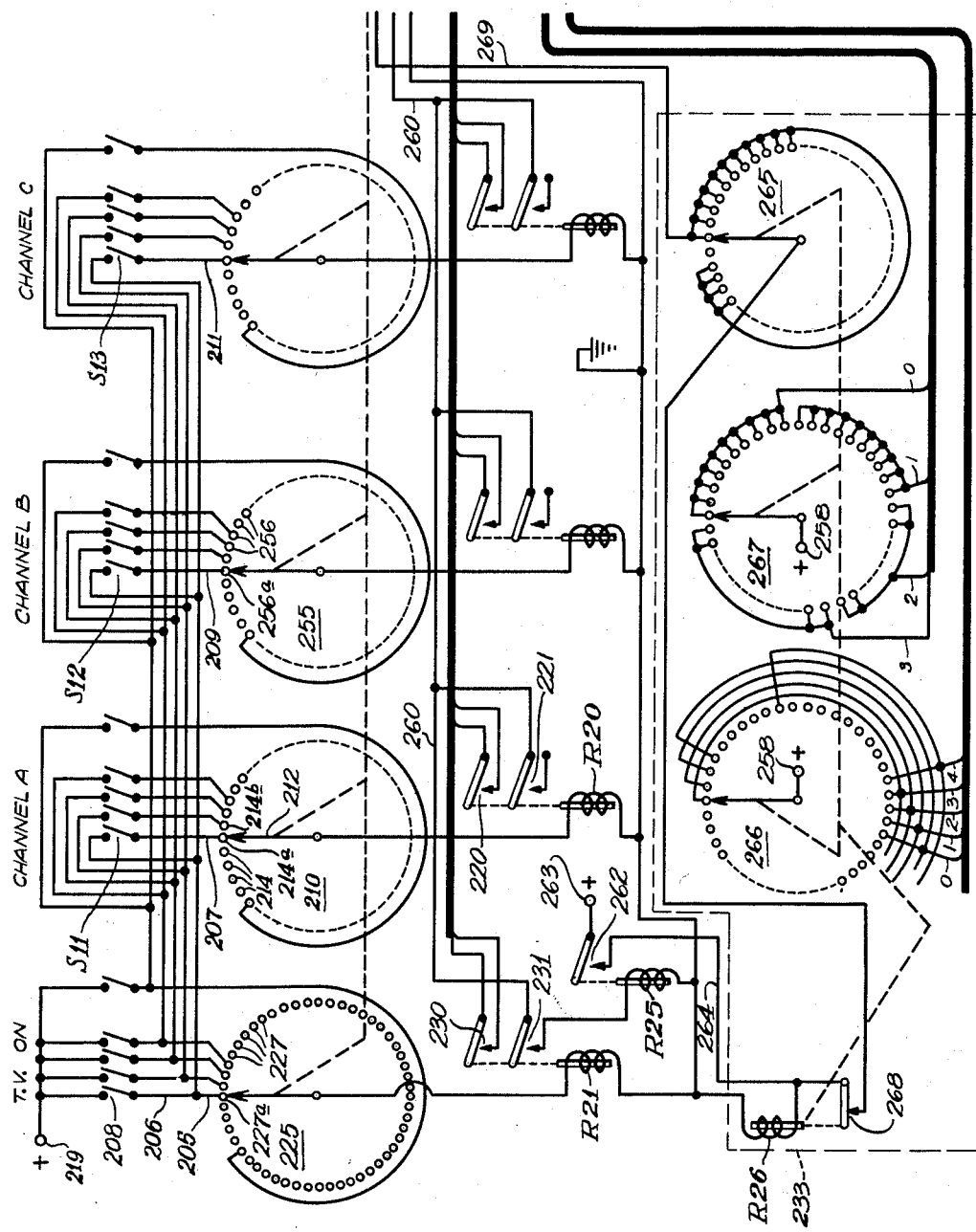

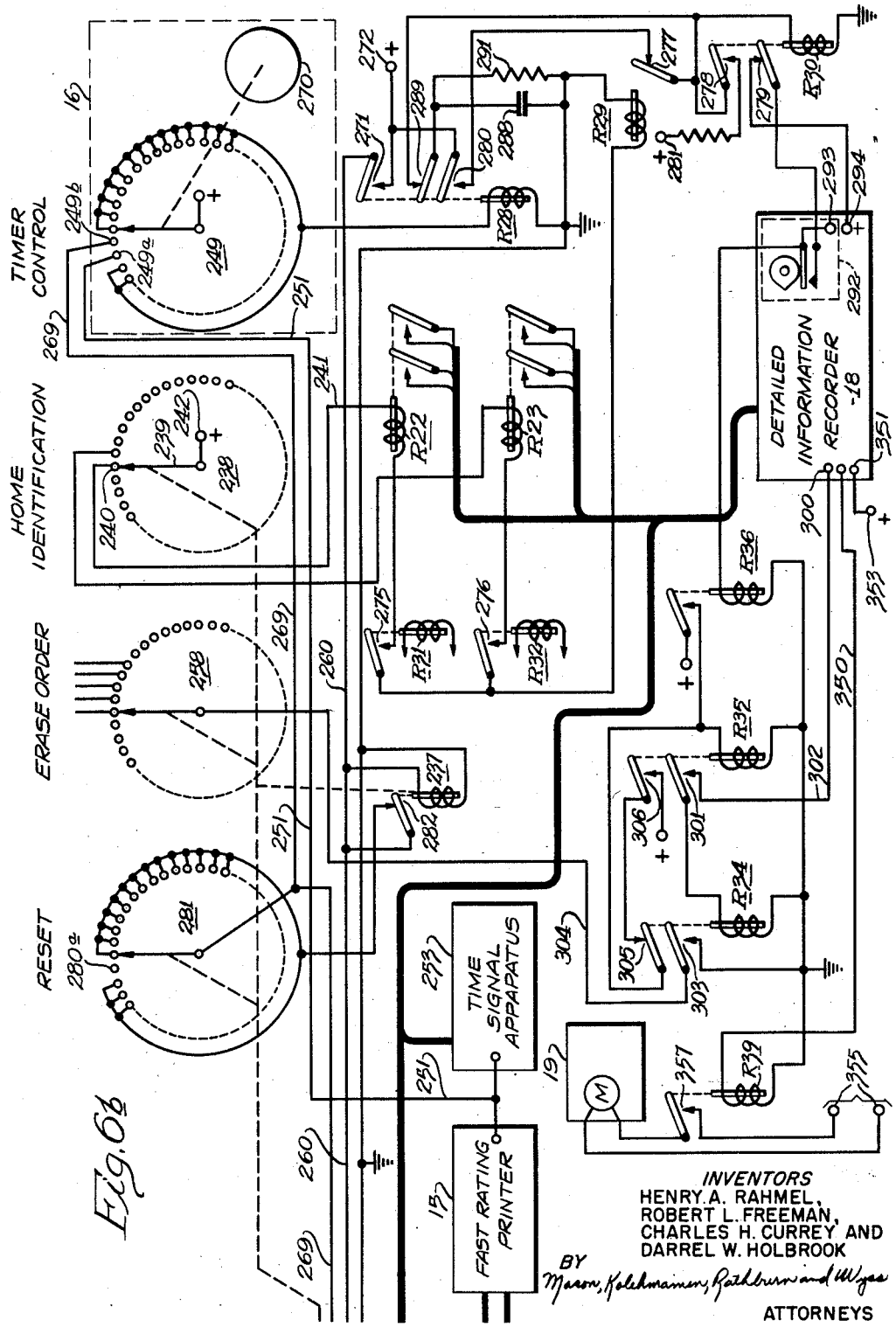

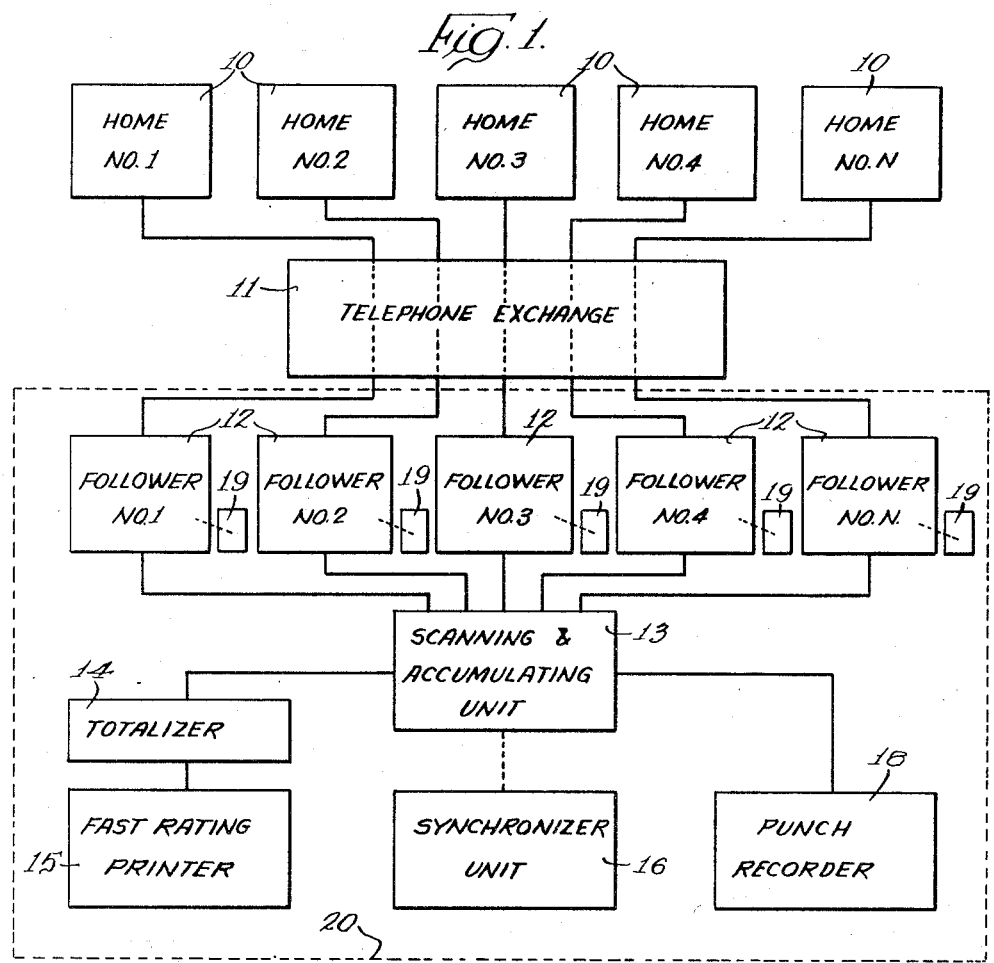
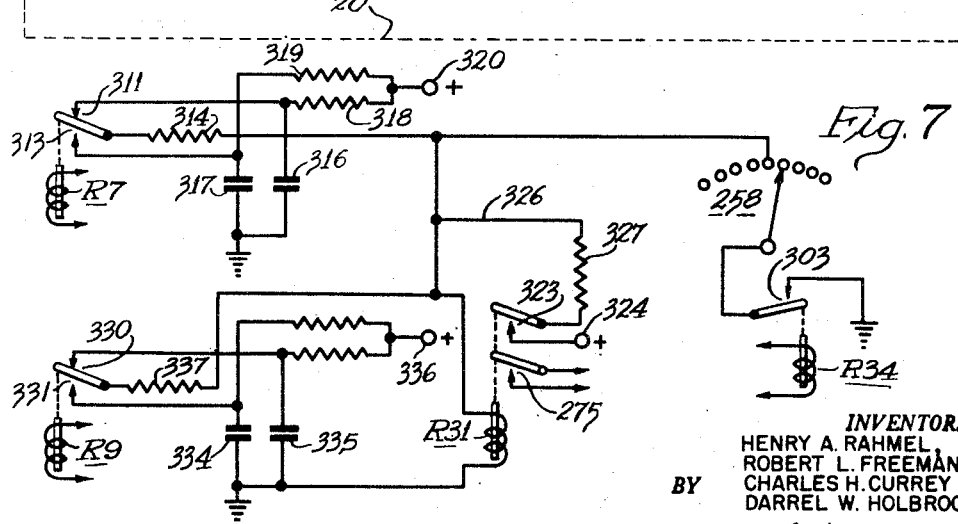

_United States Patent Office_ 2,833,859
Patented May 6, 1958

2,833,859

SYSTEM FOR DETERMINING LISTENING HABITS OF WAVE SIGNAL RECEIVER USERS

Henry A. Rahmel, Evanston, Robert L. Freeman, Glenview, Charles H. Currey, Palatine, and Darrel W. Holbrook, Park Ridge, Ill., assignors to A. C. Nielsen Company, Chicago, Ill., a corporation of Illinois Application March 16, 1956, Serial No. 572,159

35 Claims. (Cl. 179—2)

The present invention relates to wave signal receiver monitoring systems, and more particularly to an improved system for monitoring from a remote location one or more wave signal receivers to determine the extent of use of each receiver and, moreover, to determine the particular transmitting station from which program signals are received and translated by each receiver. In particular, therefore, the improved system of the present invention is well adapted to use in determining the listening habits of wave signal receiver users.

Since the realization of the importance of radio and television as an advertising medium, two principal methods for operating a television network of the type primarily financed by advertisers have been developed. Ordinarily, in the United States the advertisers purchase a relatively large period of time such as, for example, one-quarter hour, one-half hour or more and select, produce and finance the program which is televised during that period of time. In Great Britain, and sometimes in the United States, the individual transmitting stations or network of transmitting stations select and sponsor the programs or in some instances employ private contractors for this purpose, and relatively short periods of time are made available for advertisers. Although with both systems it is desirable for an advertiser to know the size of the audience reached by each program, in the latter system it is particularly important for the advertiser to know the size of the audience during selected, relatively short periods of time, and accordingly, it is desirable to provide a monitoring system which makes such information available.

Generally speaking, the effectiveness of any particular program as an advertising media in either system is directly related to the following factors:

(1) The average size of the listening audience;

(2) The average period of listening to a particular program, i. e., the "holding power" of the program; and (3) Variations in the size of the listening audience on a periodic basis.

The latter information, namely, the periodic variations in the audience, permits the detection of program components which cause audience gains or losses, determination of the types of commercial messages which causes audience loss, and the location of commercial messages during a program. Therefore, in the system presently in vogue in Great Britain where a network of stations sponsors the programs and the advertisers purchase intermediate periods of time for so-called "spot commercials," the latter two types of information are of particular importance. However, in order to make an even more accurate analysis of the effectiveness of a program to command a large audience, in addition to the above factors, it is desirable to provide the information indicative of the following:

(1) Cumulative audience, which is the total number of different homes listening to one or more of four successive broadcasts of a weekly program.

(2) Program duplication, which is the extent to which programs of the same sponsor reach different audiences.

(3) Audience flow, which is the proportion of a program's audience which was gained from people turning on or energizing their receivers from specified other programs.

(4) Program audience by market divisions, which is a tabulation of the audience of specified programs in accordance with census groupings, such as, for example, geographic location, family income, etc.

Unfortunately, considerable time is required to compute the above four ratings and since it is frequently desirable to know the effectiveness of a particular program within a very short time after the termination of that program, certain other information or ratings, while less detailed than the above factors, are both useful and necessary. These latter types of analytical information are generally known in the art as fast ratings and are usually expressed as a percentage. These ratings for television monitoring are three in number, and are as follows:

(1) Number of homes using TV
(2) Average audience for a particular program
(3) Share of audience for a particular program The first of these ratings, the homes using TV, may be computed by means of the following equation:

$$HUT = \frac{\text{Sum of sets on each minute}}{15 \times H}$$
(summation for 15 minutes)

wherein H is equal to the number of receivers being monitored.

The second of these ratings, the average audience for a particular program, may be computed by means of the following equation:

$$AA_A = \frac{\text{Sum of } A \text{ counts each minute}}{15 \times H}$$
(summation for 15 minutes)

in which A is the particular program being investigated and H is the number of monitored receivers.

The third of these ratings, the share of audience for a particular program may be computed by means of the following equation:

$$\text{Share } A = \frac{AA_A}{HUT}$$

One of the first attempts to monitor home receivers utilized the so-called "telephone-call method" which involves the making of hundreds of personal telephone calls to random selected homes during the period when a particular program of interest is in progress and statistically analyzing the results of these telephone calls to determine the extent of listening. Although the information obtained by such a method is better than no information at all, because of many inherent defects in the method which include the uncontrolled uncertainties which are introduced by human judgment, the accuracy of the results so obtained tends to be destroyed. In fact, it is entirely impossible to obtain any useful information concerning most of the factors given above when the telephone call method of monitoring is used.

Because, as pointed out above, both the networks and so-called sponsors of radio and television programs are desirous of obtaining accurate information as to the relative effectiveness of the programs which they sponsor, more accurate instrumented methods of sampling which do not require active audience collaboration have been necessarily resorted to so as to provide considerably more information than is accumulated by the telephone-call sampling technique and, moreover, entirely to eliminate the errors of human judgment associated with the personal contact types of sampling methods.

The instrumented methods or systems for monitoring receivers are in general of two types: the first utilizes a plurality of recording equipments respectively located directly at a plurality of receivers to be monitored, and the second utilizes a single recorder to which information is automatically transmitted, either periodically or instantaneously, from each monitored receiver to a central station where the information is accumulated and tabulated for use by program analysis organizations. The present invention is particularly concerned with the latter type system since such a system lends itself to producing fast ratings which may be made available a short time after the termination of a program and, moreover, the more detailed types of information may be tabulated and recorded with a minimum of delay.

Therefore, a principal object of the present invention is to provide a new and improved system for monitoring the use and operation of one or more wave signal receivers.

Another object of the invention is to provide a wave signal receiver monitoring system in which tuning and energization information is accumulated and tabulated at a location remote from the receivers which are monitored.

A further object of the present invention is to provide a new and improved apparatus and system for accurately determining the listening habits of wave signal users.

Further objects and advantages and a better understanding of the present invention may be had by reference to the following detailed description taken in connection with the accompanying drawings, in which:

Fig. 1 is a block diagram of the overall monitoring system of the present invention;

Figs. 2a and 2b are schematic circuit diagrams of the portion of the system of Fig. 1 which translates information indicative of receiver tuning conditions to a central station;

Fig. 3 is an alternative embodiment of the circuit of Figs. 2a and 2b;

Figs. 4a and 4b are somewhat schematic elevation views of improved switching apparatus suitable for employment in the collaborator units of the present system.

Fig. 5 is a schematic circuit diagram of the information accumulating and recording equipment of the present system;

Figs. 6a and 6b are detailed circuit diagrams of the central station accumulating and recording equipment; and Fig. 7 is a punch order circuit comprising another aspect of the present invention.

Figure 2A:
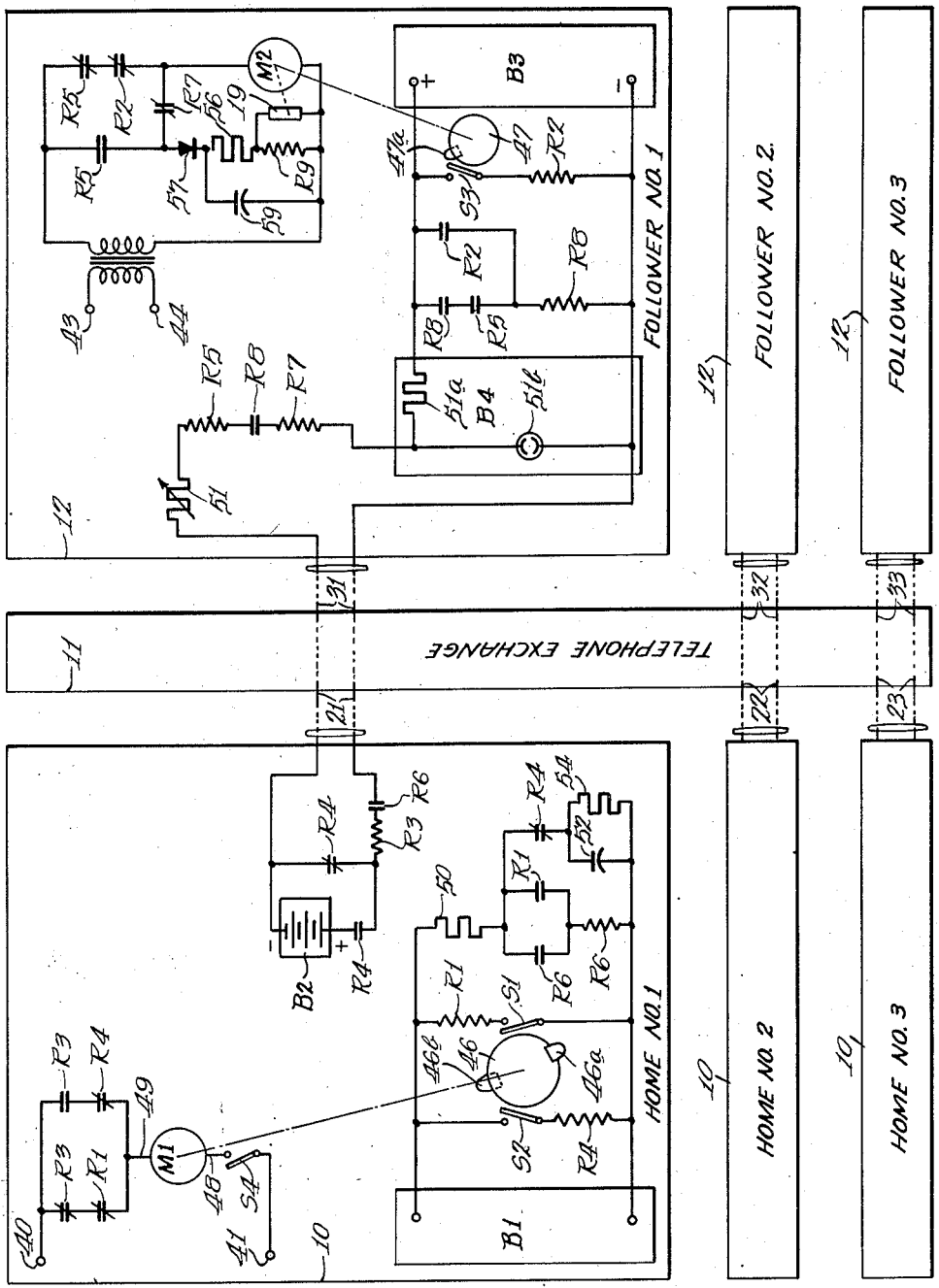

Briefly, the above and other objects are realized in accordance with the present invention by providing a system utilizing conventional direct current telephone lines for automatically translating information from a plurality of selected wave signal receivers to a central information accumulating and tabulating station. Information indicative of whether or not each respective receiver is energized and of the station or channel tuned in is accumulated once each minute at the central station and various tabulations are made so as to enable an accurate analysis of the listening or viewing habits of those persons using the monitored receivers. It will be understood that the homes or other places in which the monitored receivers are located are so selected that they are representative of a considerably larger number of homes in a given area, thus enabling the use of the accumulated information to provide an accurate rating of each program which is monitored. For example, it has been shown that by monitoring a relatively small number of selected receivers the viewing habits of a city of more than seven million may be accurately determined.

Before considering in detail the various aspects of the invention, in order to facilitate an understanding of the way in which the various portions of the overall monitoring system of the present invention interact to provide the desired information at a central accumulating and tabulating station, a summary of the operation and function of the overall system is given. Accordingly, referring to Fig. 1, the system contemplated by the present invention includes a plurality of sender units respectively located at a plurality of collaborating homes 10 which supply through the medium of a telephone exchange and associated equipment 11 to respective ones of a plurality of follower units 12 information indicative of the operating condition of the receivers located in the homes 10. Electrical signals indicative of the operating conditions of the receivers in the associated homes 10 are supplied from the follower units 12 to a scanning and accumulating unit 13 which provides once each minute electrical signals indicative of the operating conditions of the receivers in the home 10 during the preceding minute. A certain portion of information from the scanning and accumulating unit 13 is supplied to a totalizer 14 which then supplies the necessary information to a fast rating printer 15 so that once each minute the fast rating printer provides a permanent, visual record of the total number of monitored receivers which were energized during the preceding minute and also provides the number of such receivers which were tuned during that minute to each station being monitored. For the purpose of synchronizing the fast ratings with the calendar time, a synchronizer unit 16 mechanically drives the scanning and accumulating unit 13 in synchronism with the time of day. In addition to the fast rating printer 15 there is provided a punch recorder 18 which provides on a minute-to-minute basis the operating condition of each receiver being monitored, this detailed information being recorded in the form of punches on individual cards for each receiver. Accordingly, the operating condition information from the scanning and accumulating unit 13 is electrically coupled to the punch recorder 18 and in addition an electric synchronizing signal is supplied to the punch recorder 18 from the synchronizing unit 16. In the event that the punch recorder 18 breaks down for any reason whatsoever, there is provided a plurality of stand-by recorders 19 which are respectively linked to the individual follower units 12.

The following units and the associated accumulating, totalizing and tabulating equipment is located at a central station which is located remotely from the collaborating homes 10. For this reason, in Fig. 1 the equipment located at the central station is shown within the area enclosed by the dotted lines 20. Of course, although the central station 20 is located remotely from the collaborating homes 10 in order to minimize the telephone equipment which is needed to translate the operating condition information from the homes 10 to the station 20, it is desirable that the station be located within the same particular area as the collaborating homes which it services. Therefore, when monitoring a city having a population of the order of ten million, five or six systems of 50 collaborating homes each might be employed, and for purposes of economy separate central stations might be employed for each system, each central station being located as closely as possible to the homes with which it is associated.

In accordance with an important aspect of the present invention, the signals indicative of the operating conditions of the receivers are transmitted over respective telephone line circuits from each sender unit to the central station in the form of electric current signals having, in one embodiment of the invention, one of a possible amplitude three values, one value of which is zero and the other two of which are relatively low in value so as to be suitable for use in connection with conventional telephone line equipment. In the preferred embodiment of this aspect of the invention, which is shown in Figs. 2a and 2b, a signal of zero current in the telephone lines is indicative of the fact that the associated receiver is turned off or deenergized, and the other two current signals convey to the central station information indicative of the condition of tuning of the receiver. This latter function is accomplished by the use of only two signals by means of a plurality of synchronizing switching arrangements each of which utilizes a relatively constant speed motor in the sender unit and a similar motor in the respective follower unit at the central station. Whenever the condition of operation of a monitored receiver is changed and the receiver is energized, i. e, either the condition of tuning or the condition of energization is changed, the sender motor is energized and, by virtue of the absence of the intermediate level signal on the telephone line, the associated motor at the central station is energized. The shafts of both motors continue to rotate until the shaft of either one of the motors reaches an indexing or home position, at which time that motor which is at the home position is deenergized and remains deenergized until the other motor reaches its home position. As will become clear from the ensuing description, either motor may reach its respective home position first, and the operation of the system is the same in either case. When both motors have reached their home positions, the intermediate level signal is provided in the telephone lines and both motors are thereby simultaneously energized and rotate in synchronism away from their respective home positions until the shaft of the sender motor reaches a position corresponding to the condition of tuning of the receiver. At this time the sender motor is deenergized and the high level signal is placed on the telephone line which, by means of suitable switching, deenergizes the associated follower motor at the central station. Consequently, since the associated motors are operatively identical, rotating at the same speeds, the angular position of the shaft of the motor at the central station is indicative of the station or channel to which the associated receiver is tuned. Inasmuch as only a brief time, less than one minute, is required for the follower motors at the central station to move to the positions corresponding to the tuning conditions of the respective associated receivers, for minute-to-minute checking, the condition of operation of each monitored receiver is effectively provided instantaneously at the central station.

As may thus be seen, the information which is provided at the central station for each receiver being monitored is two-fold; one, there is an indication as to whether or not each associated receiver is energized, and two, there is an indication of the condition of tuning of each of the receivers which are energized. The information regarding the condition of energization of each of the respective receivers is indicated by the fact that an associated relay in the telephone line circuit at the central station is energized or deenergized by the presence or absence of current in the telephone lines, and as pointed out above, the condition of tuning is indicated by the angular position of the shaft of the follower motor.

In accordance with another aspect of the present invention, the information which is available at each follower unit at the central station is accumulated, tabulated and recorded. For purposes of accumulation, the angular position of the shaft of each follower motor is converted into an electrical signal, and the signals, i. e., the tuning indication signal and the energization indication signal from each follower unit are periodically totalized for application to the fast rating printer which records after each period of totalization the number of receivers which are energized and the number of these receivers which are tuned to each of the stations being monitored. In the described and illustrated embodiment of the invention, this information is accumulated, tabulated and printed once each minute. It will be understood, of course, that the period of accumulation is a matter of expediency and that, if desired, the repetition rate may be increased or diminished. By accumulating this information once each minute, however, there is provided on a minute-to-minute basis, the "fast ratings" heretofore described.

In accordance with a further aspect of the invention, a record is made by a punch type recorder of the condition of operation of each monitored receiver for every minute of the day, and in order to minimize the size of the record media for each monitored receiver, an indication is recorded only when the condition of operation of a receiver is changed even though the receiver is monitored once each minute.

In accordance with other and further aspects of the invention, various circuits are provided which insure the accurate and reliable operation of the central station equipment which provides the information indicative of the operation of each individual monitored receiver. Moreover, there are other features of this system which will be described more in detail hereinafter which effect the proper operation of the system irrespective of any breakdowns or faults in any of the associated equipment.

Referring now to Figs. 2a and 2b wherein is shown in schematic form the motor control portion of the monitoring system of the present invention which provides at the central station indications of receiver energization and of receiver tuning. The circuits of Figs. 2a and 2b are physically identical. The illustration in Fig. 2b is a wiring diagram showing the relay contacts in physical association with the associated pick-up coils.

Fig. 2a is an across the line disassociated contact type schematic diagram which will enable those skilled in the art to have a facile understanding of the operation of this portion of the overall system. The motor control circuit comprises a plurality of sender units respectively located at the collaborator homes 10, designated as home No. 1, home No. 2, and home No. 3, and corresponding and associated follower units 12 designated respectively as follower No. 1, follower No. 2 and follower No. 3. Each sender unit is located at a receiver to be monitored and it will be understood that there are as many sender units as there are receivers to be monitored at any one time, associated sender units and follower units 12 being connected together through conventional direct current public telephone equipment.

The telephone equipment which is provided for connecting the followers and collaborators together includes the telephone exchange 11 which controls the switching together of the telephone lines designated as 21, 22 and 23 and 31, 32 and 33, the former group of telephone lines being connected between the sender units at the homes 10 and the telephone exchange 11 and the latter group being connected between the follower units 12 and the telephone exchange 11. In the interest of economy, the telephone equipment is neither owned nor operated by the organization making the survey of audience listening habits, but the equipment and services of a telephone company are rented in the same way that a subscription for ordinary telephone service is made.

Since all of the sender units and follower units are substantially identical, only the sender unit at the home No. 1 and its associated follower unit No. 1 are described in detail. The present embodiment of the invention utilizes two levels of direct current in addition to the zero current level in the telephone lines 21 and 31, and since, ordinarily, alternating voltage is commercially available at the locations of the collaborating homes, a conventional alternating current energized direct current power supply B1 is provided in the sender unit for supplying the two levels of direct voltage. Conveniently, the source B1 may consist of a pair of dry type rectifiers connected across the alternating current power lines and a suitable filter for removing any excess ripple in the rectified voltage. A source B2 of direct current voltage of lesser value than the voltage output of source B1 is shown in the drawing as a separate power source but may be and usually is a part of the source B1 conveniently using a dropping resistor and a gaseous type voltage regulating discharge device. It is desirable that the power supplies B1 and B2 be deenergized when the receiver is deenergized, but if expedient, a constant source of power such as, for example, a dry cell battery may be used and a switch (not shown) may be serially connected therewith and ganged for simultaneous operation with the On-Off switch S4 of the receiver.

The sender motor, which is designated M1, may be a one R. P. M. synchronous motor adapted to be selectively energized by alternating voltage suitably supplied from conventional alternating current power lines connected to the terminals 40 and 41, and a similar motor M2 in the follower unit is adapted to be selectively energized by alternating voltage similarly supplied between the terminals 43 and 44. Through cooperating mechanical links, the motors M1 and M2, respectively, drive a pair of switch actuating cams 46 and 47, the cam 46 being provided with two irregularities, 46a and 46b, for respectively actuating a pair of mutually exclusive switches S1 and S2, which are independently located about the periphery of the cam 46, and the cam 47 is provided with a single irregularity 47a for actuating a switch S3 in the follower unit No. 1. The irregularities 46a and 46b are so positioned that for each complete revolution of the cam 46, each of the switches S1 and S2 is closed only once, and then for but a relatively small angle of rotation of the cam 46, and the cam 47 is adapted to close the switch S3 for one relatively brief period of time during each complete revolution thereof. The switches S1 and S3 are provided at a fixed position with respect to the shafts on which the cams 46 and 47 are respectively mounted and, being used as indices, are hereinafter called homing switches.

The homing switches S1 and S3 are self-biased in an open circuit condition and serially connected, respectively, with the pick-up coils of relay R1 and R2 across respective direct current power supplies B1 and B3. The power supply or source B3 may be similar to the source B1 but more suitably is a low impedance source of power which is used for energizing all of the follower units 12 at the central station.

Interconnected between the terminal 41 and one terminal 48 of the motor M1 is the switch S4 which is actuated to a closed circuit condition only when the associated receiver is energized. Consequently, the switch S4 may be the conventional On-Off switch of the receiver, in which case the motor M1 and associated switching circuit are connected in parallel with the normal receiver circuits. As shown, the switching circuit for controlling the energization of the motor M1 also includes the normally closed contacts of relays R1 and R3 serially connected between the other terminal 48 of the motor M1 and the terminal 40. Paralleling this circuit is a circuit through one of the normally closed sets of contacts and the single set of normally open contacts of a relay R4 which circuit is also serially connected between the motor terminal 48 and the supply terminal 49.

Therefore, when the switch S4 is closed at the time that the receiver is initially energized, the power supplies B1 and B2 are rendered effective and the motor M1 is energized through the series connection of the normally closed contacts of the relays R1 and R3 from the power supplied across the terminals 40 and 41. At the time the switch S4 is initially closed, in the absence of a power failure or other breakdown at the central station, the shaft of the motor M2 is so positioned that the homing switch S3 is closed thereby energizing the relay R2. This condition exists because until the relay R2 is picked up the motor M2 is energized through the series switching circuit comprising the normally closed contacts of a relay R2 and the normally closed contacts of a relay R5. Since the coil of the relay R5 is serially connected in the telephone line circuit and thus deenergized when the telephone line circuit is open, the motor M2 is energized until the cam 47, which is driven thereby, actuates the homing switch S3 to pick up the relay R2 and open the energization circuit of the motor M2. Similarly, the motor M1 is energized until the cam surface 46a engages and closes the homing switch S1 thereby to energize the relay R1. Upon the energization of the relay R1, the normally closed contacts thereof in the energization circuit of the motor M1 are opened thereby to stop the rotation of the motor M1. At the time the motor M1 is stopped, a relay R6 is energized through the normally open contacts of the relay R1 which is serially connected with the coil of the relay R6 and a resistor 50 across the power supply B1.

In series with the telephone line circuit 21 there is connected the set of normally open contacts of the relay R6, the winding of the relay R3 and another set of normally closed contacts of the relay R4. As shown, in the follower unit the telephone lines are included in the series circuit which comprises the winding of a high level relay R7, a set of normally open contacts of a relay R8, the pick-up coil of the relay R5, the power supply B4, and an adjustable resistor 51. The resistor 51 enables fine adjustment of the current levels in the line. As shown, the power supply B4 provides a voltage of lesser value than that provided by the power supply B3 and, therefore, may include a series resistor 51a and a gaseous regulator tube 51b to provide a voltage of constant value for energizing the telephone line circuit.

In view of the fact that the winding of the relay R8 is in series with a pair of normally open contacts of the relay R2 across the power supply B3, when the homing switch S3 is closed, the energization of the relay R2 energizes the relay R8. Consequently, when both motors M1 and M2 are at their home positions the normally open contacts of the relays R6 and R8 are closed and a circuit is completed through the telephone lines 21 and 31 thereby to energize the relay R3 in the collaborator unit and the relay R5 in the follower unit. As shown, the relays R6 and R8 are each provided with a set of normally open holding contacts so that the telephone line circuit remains completed when the motors M1 and M2 leave their respective home positions in search of the station which is tuned in. A set of normally open contacts of the relay R5 are serially connected across the power supply B3 with the holding contacts of the relay R8 so that the relay R8 is dropped out when the telephone line circuit is broken thereby to reset the switching circuit in the follower unit for indicating the next operating condition. The motor M1 is thus energized through the circuit including the normally closed contacts of the relay R4 and the normally open contacts of the relay R3, and the motor M2 is thus energized through the circuit comprising the normally closed contacts of the relay R7 and the normally open contacts of the relay R5. Since both motors are simultaneously energized when the telephone line circuit is completed and rotate at the same speed, they rotate in synchronism. Because the relays R6 and R8 are respectively connected in series with the telephone line circuit, either motor M1 or M2 may reach the home position first and the other motor M1 or M2 is energized until it reaches its home position, at which time both motors are simultaneously energized. In the system of the present invention, the sender and follower units return to the home position every time that a change in operating condition occurs at the receiver before commencing the next hunting operation, and therefore, since the follower motor may operate at a slightly lesser speed than the sender motor, it is important that the system be synchronized irrespective of which motor reaches the home position first. Moreover, in the event of a power failure or other breakdown at the central station which might cause the motor M2 to be temporarily deenergized, in order to prevent the overlooking of a change in operating condition which might have occurred during the shut-down period it is necessary that as soon as the follower unit is again rendered operative the system be brought into synchronism and record during the next scanning period the last change made during shut-down.

As will be described more fully in detail hereinafter in connection with Figs. 4a and 4b, the switch S2 in the collaborator unit is movable about the periphery of the cam 46 in such manner that its angular position with respect to the shaft of the cam 46 is representative of the tuning condition of the receiver being monitored. When, therefore, the camming surface 46b is in a position to actuate the switch S2, the shaft of the motor M1 has rotated from its home position through an angle which corresponds to the tuning condition of the receiver. The winding of the relay R4 is serially connected with the switch S2 across the source B1, and, therefore, actuation of the switch S2 energizes the relay R4 which has, in the telephone line circuit, a set of normally open contacts serially connected with the source of direct current voltage B2 across a set of normally closed contacts of the relay R4. It may thus be seen that upon actuation of the switch S2 substantial current boost occurs in the telephone circuit by virtue of the source of voltage B2 being added in series with the source B4 in the telephone line circuit. As heretofore indicated, the relay R7 in the follower unit is of the high level type remaining in a dropped out condition when only the source of voltage B4 is connected in the telephone line circuit but being picked up when the source of voltage B2 is serially added to the circuit. During that portion of the cycle of operation when both motors are rotating in synchronism, the motor M2 is energized through the switching circuit including the normally closed contacts of the relay R7. Consequently, when the motor M1 actuates the switch S2 thereby to increase the current level in the telephone lines and energize the relay R7, the motor M2 is deenergized. Both of the motors M1 and M2 are thus deenergized when the shafts thereof are in angular positions corresponding to the tuning condition of the monitored receiver, and by virtue of the fact that both motors employ reduction gear boxes which step down the speed of rotation in the order of five hundred to one, the output shafts of the motors M1 and M2 stop abruptly when the motors are deenergized. Until the operating condition of the receiver is changed either by deenergizing the receiver or by tuning in a different station, the telephone line circuit is completed, the high level signal subsists, and the motors M1 and M2 remain deenergized. If, for example, the receiver is deenergized by opening the switch S4, the power supply B1 is deenergized thereby dropping out all of the relays at the collaborator or sender unit 10. Since the normally open contacts of the relay R6 are connected in series in the telephone line circuit, the relays R5, R7 and R8 at the follower unit are similarly dropped out and the motor M2 is again energized until the cam 47 associated therewith closes the home switch S3 to pick up the relay R2 which picks up the relay R8.

In the event that the receiver is merely re-tuned, which would result in the switch S2 being open while the switch S4 remains closed, it is important that the relay R6 be dropped out so that the motor M2 is energized until it reaches its home position. To this end, a circuit comprising a capacitor 52 serially connected with a normally closed set of contacts of the relay R4 is connected in shunt across the series circuit comprising the coil of the relay R6 and the normally open holding contacts of the relay R6. Consequently, when the switch S2 is opened, thus causing the relay R4 to drop out for at least a short period of time, the capacitor 52 presents a sufficiently low impedance across the holding circuit of the relay R6 to cause the relay R6 to drop out. In order to insure that the capacitor 52 is discharged when the relay R4 is energized, the resistor 54 is connected in shunt therewith to provide a suitable discharge path.

For the purpose of providing an indication of the condition of energization of the monitored receiver, the coil of a relay R9 is connected so as to be energized whenever the telephone line circuit is completed. Specifically, the coil of the relay R9 is serially connected with a resistor 56, a unidirectional impedance device 57, and a set of normally open contacts of the relay R5 across the source of alternating current voltage indicated by terminals 43 and 44. Consequently, when the relay R5 is picked up, half-wave rectified alternating current is provided for energizing the relay R9. A change in the condition of closure of a set of contacts on the relay R9 (not shown in Fig. 2a) thus indicates that a change has been made in the operating condition of the associated receiver.

For the purpose of providing a record of receiver operating conditions during the period that the punch recorder 18 might possibly be broken down, the stand-by recorders 19 are each of the type disclosed in Patent No. 2,645,549—Bateman et al., assigned to the assignee of the present invention. Accordingly, the recorder 19 includes a stylus which is mechanically linked to the output for selective positioning with respect to a movable record medium in accordance with the angular orientation of the shaft. The stylus is connected across the coil of the relay R9 so as to be energized whenever the associated receiver is energized. However, as is more fully described in connection with Fig. 6, the record medium, which is a flexible tape, is moved past the stylus only when the punch recorder 18 is inoperative.

The motor control circuit of the present invention has been described in connection with multi-level direct current control signals but it should be understood that a multi-level alternating voltage system can be utilized if other conditions permit. Moreover, a system operating with control signals having different frequencies might similarly be used in accordance with the basic teachings of this invention.

In some cities the telephone installations are provided with alternating current type repeaters, namely, transformers, which will not translate direct current signals from the collaborating units to the central station. As pointed out above, a simple alternating current counterpart of the circuit of Fig. 1 may be provided for use in connection with such systems only if the telephone equipment of these systems is able to handle the necessary high power signals. In the event, however, that low power alternating current signals must be employed, there is provided in accordance with another aspect of the invention the circuit of Fig. 3 which translates from each collaborator to the central station the same information as is conveyed by the circuit of Figs. 2a and 2b.

In Fig. 3, there is shown an embodiment of the invention utilizing three levels of alternating voltage on the plurality of telephone lines 71 and 72, which lines are respectively connected between the collaborating unit $10^1$ and the telephone exchange 11 and the follower unit $12^1$ and the telephone exchange 11. In contradistinction to the embodiment of the invention illustrated in Figs. 2a and 2b wherein two sources of direct current voltage were adapted to be connected in the telephone line circuit to enable the selective supplying of one of three levels of voltage to the line, in the embodiment of the invention shown in Fig. 3 a single source of alternating voltage, indicated diagrammatically at B5, is disposed at the follower unit $12^1$ and serially connected in the telephone line circuit. A resistor 75 in the sender or collaborator unit $10^1$ is adapted to be selectively switched into and out of the telephone line circuit thereby controllably to provide the necessary two selectable levels of alternating current in the telephone line circuit. For purposes of simplifying the schematic diagram of Fig. 5, the source B5 has been shown in block diagram form as a separate source, but it will be understood that in an actual reduction to practice of this circuit the source B5 is suitably a voltage divider energized from the alternating current power lines at the central station and may be used for energizing all of the telephone line circuits used in the overall system.

The motor M3 at the sender unit $10^1$ is adapted to be selectively energized by alternating voltage suitably supplied from conventional alternating current power lines connected to the terminals 77 and 78, and a similar motor M4 in the follower unit 12¹ is adapted to be selectively energized by alternating voltage suitably supplied to the terminals 80 and 81. Through cooperating mechanical links, the motor M3 drives a switch actuating cam 83 which is provided with two irregularities, 83a and 83b, for respectively actuating a pair of switches S5 and S6, which are spatially arranged about the periphery of the cam 83. Similarly, the motor M4 drives a cam 84 which is provided with a single irregularity 84a for actuating a switch S7. The motors, cams, and cam actuated switches are operatively the same as those described in connection with Figs. 2a and 2b so that for each complete revolution of the cams 83 and 84 the switches S5, S6 and S7 are closed only once and then for but a relatively small angle of rotation of the respective cams 83 and 84. The switches S5 and S7 are the homing switches and accordingly are disposed at fixed positions with respect to the shafts on which the cams 83 and 84 are respectively mounted.

The homing switches S5 and S7, which are self-biased in an open circuit condition by any suitable means, are serially connected with the pick-up coils of relays R11 and R12 across respective direct current power supplies B6 and B7. The power supplies or sources B6 and B7 may be suitably energized from alternating current power lines thereby to provide direct current output voltages, and although the power supply B7 in the follower station 12¹ is adapted to be energized at all times, the power supply B6 is adapted to be energized only when the receiver being monitored is energized.

Energization of motor M3 is dependent upon the energization of the receiver being monitored by virtue of the receiver On-Off switch S8 which is interconnected between the power terminal 78 and one terminal of the motor M3. Moreover, the switch S8 is in the energization path of all of the relays and associated circuits in the collaborator or sender unit 10¹. Consequently, the motor M3 and all other circuits in the collaborator unit 10¹ are energized only when the receiver is energized by the closing of the switch S8. As shown, initial closing of the switch S8 energizes the motor M3 through the circuit comprising a conductor 86, a conductor 87, the normally closed contacts 88 of a relay R11 and the normally closed contacts 89 of a relay R13. An alternative path of energization for the motor M3 is along the conductor 90 to the normally closed contacts 91 of the relay R14 and thence through the normally open contacts 93 of the relay R13.

For the purpose given in connection with the embodiment of the invention shown in Figs. 2a and 2b, upon initial energization of the motor M3 the shaft of the motor M4 is ordinarily in a position such that the homing switch S7 is closed thereby energizing the relay R12. This condition exists because unless the relay R12 is picked up the motor M4 is energized from the alternating current line voltage which is connected to the terminals 80 and 81 through the series switching circuit comprising a conductor 94, the normally closed contacts 95 of the relay R12, the normally closed contacts 96 of a relay R15, and the conductor 97. However, as pointed out in connection with Figs. 2a and 2b, the motor control circuit causes the motors M3 and M4 to start the seeking period simultaneously irrespective of which motor reaches the home position first. Assuming, therefore, that the motor M4 is the first to reach the home position the relay R15 is deenergized because the telephone line circuits 71 and 72, are open, the motor M4 remains energized until the cam 84 actuates the switch S7 to pick up the relay R12, open the contacts 95 and thus deenergize the motor M4. The motor M3 continues to operate until the cam 83 engages and closes the switch S5 thereby to energize the relay R11, the normally closed contacts 88 of which are in the energization circuit of the motor M3. At the same time that the contacts 88 are opened, another set of normally open contacts 100 of the relay R11 are closed and being serially connected in the telephone circuit provide in the collaborator unit 10¹ a completed telephone line circuit which includes the lower telephone line 71, a resistor 101, conductor 102, the contacts 100, a conductor 103, the resistor 75, and the upper telephone line 71.

As shown, the telephone line circuit in the follower unit 12¹, which comprises a resistor 104, a pair of normally open contacts 105 of the relay R12, the power supply B5 and an adjustable resistance element 106, is completed when relay R12 is picked up, and therefore, when the motor M4 is in the home position. Consequently, when both motors M3 and M4 are at their home positions the telephone line circuit is completed, a circulating current is provided therein by the power source B5 and voltage drops occur across the resistors 100 and 104.

In order simultaneously to energize the motors M3 and M4 after they have reached their respective home positions, thus insuring correspondence of angular orientation between the respective shafts thereof, a plurality of tetrodes 108 and 107, preferably thyratrons, are provided for controlling respective relays in the sender and follower units 10¹ and 12¹.

The tetrode 108 is located in the collaborator unit 10¹ and is suitably provided with an anode 109, a cathode 110, and a control electrode 111. The control electrode 111 is connected through a grid current limiting resistor 112 to the conductor 102 and the cathode 110 is connected through a suitable source B9 of polarized bias potential to the lower side of the resistor 101. The anode circuit of the tetrode 108 is energized from across a bridge type full-wave rectifier 114 which is suitably energized from the alternating current power lines which are connected to the terminals 77 and 78. It may thus be seen that the relay R13, the coil of which is connected in the anode circuit of the tetrode 108, is energized when the telephone line circuit is completed by the presence of an alternating voltage signal applied across the resistor 101 between the control electrode 111 and the cathode 110. Similarly, the tetrode 107 which is connected in the follower unit 12¹ is provided with an anode 114, a control electrode 115 and the cathode 116. A grid current limiting resistor 117 is connected between the control electrode 115 and the upper end of the resistor 104 and the cathode 116 is connected through a suitable source B10 of polarized bias potential to the lower end of the resistor 104. So that the tetrode 107 will be conductive when the telephone line circuits are completed, which is signified by the presence of a voltage drop across the resistor 104, the anode-to-cathode circuit of the tetrode 107 is energized from a suitable bridge type full-wave rectifier 118 which is connected to be energized from the power lines connected to the terminals 80 and 81. The coil of the relay R15 is connected in the anode circuit of the tetrode 107 so that when a conductive path is completed between the anode 114 and the cathode 116, the relay R15 picks up to close the normally open contacts 119 thereof to provide a complete energization circuit for the motor M4 which includes a conductor 120, a pair of normally closed contacts 121 on a relay R17, the contacts 119 and the conductor 97. Similarly, the energization circuit for the motor M3 is simultaneously completed through the circuit which includes the conductor 86, the conductor 90, the normally closed contacts 91 of relay R14, a conductor 122, and the contacts 93 of relay R13.

In order to cause the follower motor M4 to stop at the instant that the cam 83 is at a position corresponding to the tuning condition of the receiver being monitored, a circuit is provided for causing the relay R17 in the follower unit 12¹ to pick up when the switch S6 in the collaborator unit is closed, which, as is described in detail above, is closed only when the shaft of the motor M3 is in a position corresponding to the tuning condition of the receiver. A tetrode 123, preferably a thyratron, is connected selectively to energize the relay R17 when the current in the telephone line circuit exceeds a predetermined value, and the relay R14 in the collaborator unit is adapted to increase the current in the telephone line circuit above this predetermined value when the switch S6 is closed. Specifically, the relay R14 is picked up by the current provided therein from the source B6 through the circuit comprising a conductor 124, a conductor 125, the switch S6 and a conductor 126. A pair of normally open contacts 127 on the relay R14 are connected across the resistor 75 so that when the switch S6 is closed, the current level in the telephone line circuit is appreciably increased thereby to provide a voltage drop of increased value across the resistor 104 in the follower unit 12¹. This increase in voltage across the resistor 104 is detected by means of the tetrode detector 123 which is provided with an anode 131, a cathode 132, and a control electrode 133. A grid current limiting resistor 135 is connected between the control electrode 133 and the upper end of the resistor 104 and the cathode 132 is connected through the source of bias voltage B10 to the lower end of the resistor 104. The tetrode 123 is adapted initially to conduct when the voltage drop across the resistor 104 exceeds a predetermined value, which predetermined value is selected to be intermediate the value effected when the resistor 75 is connected in the telephone line circuit and the value effected when the resistor 75 is shorted out of the telephone line circuit. Therefore, it may be seen that the tetrodes 107 and 108 are energized when the telephone line circuit is completed signifying respectively that the motors M3 and M4 are in the home positions, and the tetrode 123 is energized when the motor M3 in the collaborator unit has reached the position corresponding to the tuning condition of the receiver.

In order to maintain the normally open contacts 105 of the relay R12 closed thereby to maintain the telephone line circuit complete after the motor M4 has permitted the switch S7 to open, a pair of normally open holding contacts 137 on the relay R12 are serially connected with a pair of normally open contacts 139 of the relay R15 and the coil of the relay R12 across the source B7. As a result of this circuit, once that the switch S7 is closed the relay R12 remains energized until the relay R15 is dropped out, this occurring only when the telephone line circuit is broken by virtue of the dropping out of relay R11 when the associated receiver is deenergized.

Consequently, the motor M4 is energized from the time the relay R11 is picked up until the tetrode 123 is fired thereby energizing relay R17 and opening the energization circuit of the motor M4.

In order to insure that the relay R11 drops out when the tuning condition of the receiver being monitored is changed so that the switch S6 is opened while the switch S8 remains closed, a capacitor 140 is serially connected with a pair of normally closed contacts 142 on the relay R14 across the serial connection of the holding contacts 144 and the coil of the relay R11. Consequently, when the switch S6 is opened, the relay R14 drops out thereby effectively to connect the capacitor 140 across the coil of the relay R11. The initial low impedance of the capacitor 140 thus reduces the current in the coil of the relay R11 below the value necessary to sustain it in a picked-up condition.

It will thus be seen that the electronic motor control circuit of Fig. 3 operates substantially the same as the circuit of Figs. 2a and 2b, the principal difference being that the circuit of Fig. 3 utilizes alternating current signals on the telephone line. In both systems, however, the tuning condition seeking operation is completed in sufficient time to enable the provision of accurate fast ratings. In addition, in both systems the sender motor and follower motor are synchronized every time that a change in operating condition takes place, thereby to prevent the accumulation of error should any exist in the follower circuits.

Referring now to Figs. 4a and 4b of the drawings, there is shown switching apparatus for controlling the motor at the sender units 10 or 10¹. In order to facilitate a better understanding of this apparatus, it is described in connection with the circuit of Figs. 2a and 2b for controlling the operation of the sender motor M1. As described in connection with Figs. 2a and 2b the motor M1 at the sender unit 10 controls the actuation of the switches S1 and S2 for causing the shaft of the follower motor to indicate the tuning condition of the receiver. It will be understood that although the apparatus is described in connection with Figs. 2a and 2b that it is equally suitable for use in connection with the motor M3 of Fig. 3 and in any other similar application in which a single motor is used for selectively actuating a plurality of switches in an adjustable predetermined sequence.

The motor M1 is suitably a conventional synchronous or induction type timer motor which operates through a reduction gear train 150 to drive at a relatively low speed an output shaft 151 which is journaled in suitable apertures in upright bracket plates 152 and 153. The brackets 152 and 153 are provided with bottom flanges or feet 152a and 153a which are suitably secured as by welding to a base plate 155. The end 156 of the shaft 151 is reduced in cross-section for reception in a cylindrical recess 158 provided in a shaft 159 which is aligned with the shaft 151 and suitably journaled in an aperture in a bracket plate 161 having a flanged bottom portion 161a which is suitably secured to the base plate 155. The switch S1 is mounted near the top of the bracket plate 163 by suitable headed screws 163 and 164 and is provided with an actuating arm 165 which is pivotally mounted at one end thereof on spaced apart ears 166 which protrude from the main switch body. The switch S1 is further provided with an actuating plunger 168 which when depressed causes the completion of the circuit between the input leads 169 to the switch S1 and the pivoted arm 165 is spring biased away from the plunger 168 such that the circuit between the conductors 169 is normally opened. As shown, a disk 171 having a centrally located apertured boss 172 is secured to the shaft 151 by means of set screw 173 and is provided near the periphery thereof with a cam actuating arm 174. The arm 174 may be a threaded rod which is received in a suitable aperture in the disk 171 and secured thereto by means of a pair of threaded nuts 176 and 177. The switch S1 and the rod 174 are spatially arranged with respect to one another such that when the disk 171 is rotated about the principal axis thereof the rod 174 engages the pivoted arm 165 thereby depressing plunger 168 and completing the circuit between the conductors 169.

In order to mount the movable switch S2 so that the angular position thereof is indicative of the tuning condition of the receiver being monitored, a switch support disk 179 having an apertured central boss 180 is secured to the shaft 159 by a set screw 181. The switch S2 is mounted near the periphery of the disk 179 by means of a plurality of set screws 183 and 184 and is substantially identical to the switch S1 being provided with a pivoted actuating arm 185 corresponding to the switch actuating arm 165 of the switch S1. As indicated above, the rod 174 extends outwardly from both sides of the disk 171 and is adapted to engage the actuating arm 185 of the switch S2 thus to complete the circuits between the conductors 187 thereof. It may be seen that since the shafts 151 and 159 are mutually exclusive with respect to one another 360 degrees of rotation of the switch S2 with respect to the shaft 151 is enabled. In those cases where a television receiver is monitored, the shaft 159 may suitably be an extension of the main tuning shaft of the television tuner.

Alternatively, a pulley or gear (not shown) may be secured to the shaft 159 and adapted to be driven by suitable coupling means in accordance with the angular position of the tuning shaft of the receiver.

In order to enable a full 360 degrees' rotation of the switch S2 so that normal operation of the tuning shaft of the receiver being monitored is effected, that is, the tuning shaft of the receiver may be rotated continuously in the same direction, a pair of suitable conductive rings 190 and 191 are supported on and insulated from the bracket 161 and are adapted to be respectively engaged by a plurality of brushes 192 and 193, which brushes are connected to respective ones of the leads 187. It will be understood, of course, that in the event that it is found to be inexpedient to employ the brushes 192 and 193 in connection with the slip rings 190 and 191 in order to connect the switch S2 into the circuit of the unit 10 or 10¹, a stop as taught in copending application, Serial No. 549,685, filed November 29, 1955, in the name of Henry A. Rahmel and assigned to the same assignee as the present invention may be provided. The motor M2 and associated camming disk 47 and switch S3 in the follower unit of Figs. 2a and 2b may be similar in construction to the arrangement shown in Figs. 4a and 4b with the mechanism associated with the movable switch S2 being eliminated since there is no need for such switching equipment at the follower unit 10.

For the purpose of assisting a technician in the field to correlate the angle of orientation of the output shaft of the follower motor M2 or M4 as the case may be with the station to which the associated receiver is tuned, a pointer 195 is fixed to the shaft 151 and indexing marks (not shown) are provided on the adjacent face of the bracket 152 at positions corresponding to the stations to which the receiver may be tuned. As a result, in initially installing the sender unit 10 or in checking its operation, means are provided within the sender unit for indicating to the technician the station to which the receiver is tuned.

It will thus be seen that the motor control circuit of the present invention provides at each follower unit 12 or 12¹ an indication of the energizing and tuning conditions of the respective associated receivers. In accordance with a further aspect of the present invention, scanning, tabulating, and recording equipment is provided at the central station for accumulating the information provided by each of the follower units thereby to provide sufficient information to enable a market survey organization to make both fast and detailed ratings.

Referring to Fig. 5, there is shown in somewhat diagrammatic form additional central station equipment of the present invention which provides a permanent record of the tuning condition of each monitored receiver during each minute of the day as well as other less detailed information. The central station equipment includes the follower units each of which comprises in addition to motor control circuits, heretofore described, apparatus for producing electric output signals indicative of the operating condition of the associated receiver. Since the apparatus in each follower unit is identical, only the apparatus in follower unit No. 1 is shown, it being understood that similar signal generating apparatus is provided in each of the other follower units. As shown, for the purpose of effecting electric signals indicative of the operating condition of the receiver associated with the follower No. 1, there is provided the follower motor 199, the angular position of whose shaft 200 corresponds with the tuning condition of the associated receiver and on which are spatially arranged a plurality of switch actuating cam members 201, 202, 203 and 204. Obviously, the motor 199 corresponds to the motor M2 in Figs. 2a and 2b and to the motor M4 in Fig. 3. An arrangement utilizing only three cam members is suitable for the monitoring of only three stations but it will be understood that more stations may be monitored simply by providing additional cams on the shaft 200. Only three stations may be monitored with four cams because the cam member 201 corresponds to the cam member 47 in the circuit of Figs. 2a and 2b or the cam 84 of Fig. 3 and actuates a homing switch 201a for synchronizing the operation of the motor 199 in the manner discussed above. Since either the circuit of Figs. 2a or 2b or of Fig. 3 may be used for controlling the operation of the motor 199 the manner in which the switch 201a is selectively connected to the system will depend upon which of these motor control circuit arrangements is employed, but in either case, at substantially all times the angular position of the shaft 200 is indicative of the tuning condition of the receiver at the associated sender unit 10 or 10¹.

The switch actuating cams 202, 203 and 204 are adapted to actuate respective ones of a plurality of normally open switches S11, S12, and S13, which switches for the purpose of the following description will be assumed to be selectively and respectively actuated when the tuning shaft of the receiver is positioned to receive stations designated respectively as A, B, and C.

Therefore, when station A is tuned in by the associated receiver the shaft 200 of the motor 199 is in such a position.

In order to insure that the switches S11, S12, and S13 may be respectively energized only when the associated receiver is energized thereby to prevent the recording of erroneous data, one of the contact elements of each of the switches S11, S12, and S13 are connected over a conductor 206 to a pair of normally open contacts 208 of a relay R19, which relay is picked up only when the associated receiver is energized. The "television-on" relay R19 may be connected to be energized in the same manner as the relay R9 in Figs. 2a and 2b of the drawings or the relay R15 in Fig. 3, and for reasons of economy, is preferably one of these relays.

For the purpose of utilizing the condition of energization of the relay R19 and the condition of closure of the switches S11, S12, and S13 to indicate the operating condition of the associated receiver, as shown, a set of normally open contacts on the relay R19 are serially connected between a power supply terminal 219 with each of the switches S11, S12 and S13 and output conductors 207, 209 and 211. Therefore, when the relay R19 is picked up and the receiver is tuned to one of the stations corresponding to the switches S11, S12 and S13, one of the output conductors 207, 209 and 211 corresponding to the tuned-in station is energized. A television-on output conductor is directly connected to the conductor 206 so that whenever the receiver is energized and the relay R19 is picked up a signal is provided thereon. Accordingly, the conductor 205 is connected to a contact of a receiver of scanning switch 225. For example, if channel A is tuned in, the conductor 207 is energized; if channel B is tuned in, the conductor 209 is energized; and if channel C is tuned in, the conductor 211 is energized. Therefore, with the circuit arrangement shown, the voltage level of the conductors 205, 207, 209 and 211 is significant of the operating condition of the receiver associated with the follower No. 1. Since there are a number of follower units 12 or 12¹, each simultaneously providing an intelligence signal indicative of the operating condition of its respective receiver, in order to minimize the amount of apparatus required to accumulate and tabulate all of this information to enable the facile computation of the desired program ratings, the system of the present invention includes the scanning means or unit 13 which periodically extracts information from the follower units and forwards it to totalizers and other recording apparatus.

The scanning means 13 consists of a plurality of multiple contact rotary type switches to the contacts of which are respectively connected the output conductors such as 205, 207, 209, 211, etc. from the follower unit 12. There are provided at least as many such rotary switches as there are stations to be monitored and at least as many contacts on each rotary switch as there are receivers being monitored and all of those output conductors which correspond to a particular station are connected to different contacts of the same switch. Therefore, the number of contacts on a particular switch which are energized is equal to the number of receivers energized and tuned to receive the signal transmitted by the corresponding station. The wipers of the follower scanning switches are rotated in synchronism by a suitable motor, and electrical or mechanical counters are provided for tabulating the information obtained from the follower units during each scan. Where desirable or necessary, additional multiple contact type rotary switches are provided for obtaining additional information from the follower units and for other operational and control purposes. In view of the fact that each of the follower scanning switches and the associated circuitry are identical, only one such scanning circuit is described in detail, but it will be understood that there are as many such circuits as there are stations to be monotored at any one time.

Therefore, for purposes of explanation, only that circuit which scans the follower units to extract the information apposite to the receivers tuned to receive the program transmitted on channel A is shown in Fig. 5. The channel A scanning switch 210 is a multiple contact type rotary switch having a wiper arm 212 for periodically scanning the contacts 214 thereof selectively to supply to a suitable counter 213 a train of electrical pulses, the number of such pulses being equal to the number of grounded contacts engaged during the sweep. Since the number of monitored receivers which are tuned to channel A during the scanning period of the wiper 212 is indicative of the number of receivers tuned to channel A, the number of pulses supplied to the counter 213 equals the number of receivers tuned to channel A.

In order to supply a pulse of electric energy to the counter 213 each time that the wiper 212 engages an energized contact in the switch 210, and to provide similar information for use by other tabulating equipment, there is provided a relay R20, the coil of which is connected between the wiper 212 and ground. The scanning speed of the switch 210 is such that the relay R20 drops out as the wiper 212 passes from one contact to another. As shown, the relay R20 is provided with two sets of normally open contacts designated as 220 and 221, the set 221 being connected between a source of voltage connected to the terminal 223 and the input to the counter 213. It will thus be seen that the counter 213 is momentarily energized by current from the terminal 223 each time the relay R20 is picked up.

The counter 213 may be a solenoid operated mechanical type counter or it may be, as shown, a stepping switch having an armature which moves through one step each time that the counter is energized, so that there is provided an indication of the total number of times that the relay R20 is picked up. Consequently, at the end of each scanning period the counter 213 provides information indicative of the number of monitored receivers which are tuned to channel A. The set of contacts 220 are used to supply pulses of voltage to the punch recording device 18 of Fig. 1 which accumulates and provides information indicative of the minute-to-minute operating condition of each receiver being monitored.

In the event that all channels which are capable of reception are not monitored, i. e., a scanning switch and associated counter is not provided for each such channel, one additional rotary scanning switch 225 should be provided, the contacts 227 of which are connected to those conductors in the follower unit which are grounded whenever the receivers are energized. By way of example, the contact 227a thereof is directly connected to the conductor 205 in the follower unit No. 1. The coil of a relay R21 is serially connected between ground and the wiper of the switch 225 and is provided with two sets of normally opened contacts 230 and 231, the contacts 231 being serially connected between a suitable source of power connected to a terminal 232 and a counter 233, which may be identical in construction with the counter 213 and the other channel counters. At the end of each scanning period the counter 233 thus provides an indication of the number of monitored receivers which are energized during the scanning period. Since it is desirable to scan each of the follower units once each minute, in order to facilitate the translation of the information contained on the counters after each scan, in accordance with the present invention there may be provided the fast rating printer 15 for recording at the end of each scanning period the number of receivers energized and the number of receivers tuned to each channel being monitored.

In addition to accommodating the situation where all stations capable of reception are not tuned in, the scanning switch performs the function of fault locating. In the event that a fault occurs at a sender unit it is important that this be made known to the survey organization as soon as possible. By monitoring all stations that are capable of reception and by utilizing an additional "television-on" section, should any sender motor become stalled it is immediately recognizable at the central station by observance of the information printed by the fast rating printer 15. An immediate check of the individual records from the punch recorder 18 may thus be made to pinpoint the faulty unit.

Although it would be possible to provide a separate motor for driving the wipers of each of the scanning switches, for purposes of economy and in order to minimize the space required to house the central station equipment, all of the scanning switches are mounted on a common control shaft which is rotated by means of an actuator 237. It will thus be apparent that all of the scanning switches are rotated in synchronism by the actuator 237 and by so wiring the contacts of the scanning switches that the wipers thereof are simultaneously connected to contacts which are connected to different output conductors from the same follower unit, at any one time the condition of energization of those relays associated with the scanning switches is indicative of the tuning condition of a particular receiver.

To provide a record of the minute-to-minute operating condition of each monitored television receiver, there is provided the punch recorder 18 to which the relay contacts 220 and 230, and the similar contacts on the other channel scanning relays are connected in a manner to be more fully described in connection with Figs. 6a and 6b of the drawings. With this arrangement it will be clear that the signals supplied from the "television-on" switch 225 and channel scanning switches 210 and the like to the recorder 18 at any one time are related to a single monitored receiver, and in order to provide synchronizing information to the punch recorder 18 so as to enable correlation between the receivers and the information supplied thereto from the scanning relays, an identification rotary switch 238 is provided. A wiper 239 of the switch 238 is connected to a power supply terminal 242 and adapted to be rotated by the actuator 237 in synchronism with the wipers of the other scanning switches and a plurality of home identification relays R22 and R23 are respectively connected in circuit with each contact of the switch 238 so that as the scanning switches scan the signals from the follower units, the identification relays are sequentially operated, the particular relay which is actuated at any one time being indicative of the receiver whose condition of operation is indicated by the simultaneous operating condition of the "television-on" relay R21 and the channel relays. By way of example, a contact 240 on the switch 238 is connected through a conductor 241 to the coil of an identification relay R22, the other end of the coil being connected to ground. Consequently, the relay R22, which identifies the receiver at the home No. 1, is energized at the time that the wipers of the scanning switches are in engagement with the respective contacts thereof which are connected to the follower unit No. 1. Similar receiver identification relays are provided for each of the other contacts in the switch 238 and, consequently, for each of the other follower units, there being at least as many contacts in the switch 238 as there are follower units scanned. In order to enable the monitoring of a relatively large number of receivers the receiver identification relays may be each provided with two sets of normally open contacts to provide a permutation coding apparatus for supplying to the punch recorder 18 receiver identification signals for up to ninety-nine homes.

Because of the fact that televised programs are synchronized with the calendar time, the time of day provides a convenient means for identifying the particular programs televised over the respective channels. Consequently, synchronizing unit 16 is connected through a suitable coupling network 250 to the actuator 237 thereby to maintain the operation of the actuator in synchronism with the time of day. In addition, periodic signals are supplied from the synchronizing unit 16 over a conductor 251 to a time recorder 253 which may continuously supply to the printer 15 and the recorder 18 the time of day so that at the termination of each scanning period there may be recorded by the fast ratings printer 15 the time of day as well as the other information supplied from the counters. Consequently, the records which are made by the printer 15 and the punch recorder 18 contain all the information which is necessary to provide the fast ratings discussed hereinbefore. It will be understood that the full utilization of the other information which is recorded by the printer 15 and the recorder 18 may be made without resorting to a time recorder 253 but it has been found that by providing a time of day indication on the records for each tabulation or somewhat less frequently the utilization of the recorded information is greatly facilitated.

Referring to Figs. 6a and 6b, which together show in greater detail the central station equipment diagrammatically shown in Fig. 5 and, additionally, a number of circuit refinements for increasing the accuracy of the information which is tabulated by the recorder 18. Because of the limitations of the size of patent drawings the circuit of Figs. 6a and 6b is illustrated in two parts, the left-hand section being shown in Fig. 6a and the right-hand section being shown in Fig. 6b. For purposes of facilitating an understanding of the operation of the circuit of Figs. 6a and 6b, those parts which are similar to those shown in Fig. 5 are designated with like numerals. The rotary switch 225, which is the "television-on" scanning switch, has the plurality of contacts 227 thereof respectively connected to the switches in the follower units which are closed when the associated receivers are energized. The switch 210, which is the channel A scanning switch, has the contacts thereof respectively connected to be energized when the channel A switches in each of the follower units are closed. For example, as shown, the contact 214a is connected to the switch S11 which, as illustrated in Fig. 5, is located in the follower unit No. 1. Similarly, channel B scanning switch 255 has the plurality of contacts 256 thereof respectively connected to those switches in the follower units which are closed when the associated receivers are tuned to channel B; accordingly, the contact 256a thereof is connected through the conductor 209 to the switch S12, which is that switch in the follower unit No. 1 which is closed when channel B is tuned in. In addition to the "television-on" scanning switch 225 and the channel identification scanning switches 210, 255 etc., there may be provided as many other channel identification switches as is necessary. These additional channel identification scanning switches are connected to the follower units in the same manner as are the switches 210 and 255. The wiper arms of the "television-on" switch 225, the channel scanning switches 210 and 255, an erase switch 258, the receiver identification switch 238, and a reset switch 281 are ganged together for simultaneous step-by-step actuation by the actuator 237 which may conveniently be solenoid operated.

Although as pointed out above, the counters 213, 233 and any others which may be used in the system of the present invention can be either of the mechanical or electrical type, in what is at present considered to be a preferred embodiment of this invention electrical counters are utilized to provide at the termination of each scanning periods an electric signal indicative of the number of pulses supplied thereto. Since all of the counters are identical, only the counter 233 which provides a signal indicative of the number of receivers which are energized during each scanning period is shown in detail. Each time that the relay R21 is energized, which is indicative of the fact that the wiper of the "television-on" switch 225 has engaged an energized contact, a positive voltage is supplied from the conductor 260 through the contacts 231 for energization of a relay R25. The relay R25 is provided with a set of normally open contacts 262 which, when closed, connect to the conductor 264 the voltage from a suitable source of power connected to the terminal 263. Therefore, each time that the contacts 231 are closed and the relay R25 is picked up a voltage is supplied to the counter 233 through the conductor 264.

The counter 233 may consist of three multiple contact type rotary switches 265, 266 and 267 which are ganged together for simultaneous and synchronous rotation by a solenoid R26. The solenoid R26 in addition to driving the wipers of the rotary switches in the counter 233 is also adapted to actuate a pair of normally closed contacts 268 which are serially connected between the conductor 264 and the wiper of the switch 265, the switch 265 being provided for resetting the units and decimal counting switches 266 and 267, respectively, at the end of each scanning period. Each of the rotary switches in the counter 233 may be provided with fifty or more contacts, the first 10 contacts of the unit switch 266 being connected to ten separate output terminals designated respectively as 0, 1, 2, 3, 4, etc. and the next succeeding ten contacts and each succeeding ten contacts thereof being respectively connected to the ten output terminals. The first nine contacts of the tens switch 267 are connected to a conductor designated as zero, the next ten terminals are interconnected and connected to a conductor designated 1, the following ten terminals are connected to a conductor designated 2, etc. Since the wipers of the switches 266 and 267 are connected to suitable power supply terminals 258, the energized output conductors of the counter 233 indicate the number of times that the solenoid R26 has been energized since the counter 233 was last reset. Accordingly, at the end of each scanning period the counter 233 provides an electric signal indicative of the total number of receivers energized during the previous scanning period.

For the purpose of resetting the counter 233 at the end of each scanning period of the follower units, the wiper of the reset switch 265 is connected to ground through the serial connection of the normally closed contacts 268 of the relay R26 and the coil of the relay R26, and all but the last contact of the switch 265 are connected to be energized from a voltage supplied to a conductor 269 from the timer control switch 249 after the scanning period is completed and the information provided in the counters has been recorded. Consequently, when a scanning period has been completed and the information recorded, the wiper on the rotary switch of the timer control 249 engages its last contact, a positive voltage is supplied to the conductor 269, which pulses the relay R26 on and off through its normally closed contacts 263 until the wiper of the switch 265 has engaged the last contact thereof. Since the last contact is floating, the self-stepping operation is terminated. As shown, the wipers of the counting switches 266 and 267 are ganged to the wiper of the reset switch 265, whereby the counter 233 is reset at the end of each scanning period. This counting cycle is repeated during the following scanning period, and during each scanning period thereafter.

In addition to providing the reset voltage for the counters, the synchronizing unit 16 controls the actuation of the scanning switch driving solenoid 237 to synchronize the scanning periods of the "television-on" and channel scanning switches 225, 210, 255, etc., with the time of day and also supplies a print order signal to the printer 15 over the conductor 251 at the end of each scanning period prior to the time that the counters are reset.

As shown, the synchronizing unit 16 includes a multiple contact rotary switch 249, the wiper of which is driven at a constant speed by a suitable timer motor 270. A number of switching contacts of the timer control switch 249 equal to the number of homes being monitored by the system are connected to the upper end of the coil of a relay R28, the lower end of the coil of the relay R28 being connected to ground. The relay R28, through the contacts 271 thereof controls the connection of a source of voltage from a power supply terminal 272 to the conductor 260. The wiper of the timer control switch 249 is also connected to be energized from a source of voltage so that the relay R28 is picked up each time the wiper moves into engagement with a contact connected thereto. Therefore, during the time the wiper of the switch 249 engages any one of the switching contacts, the conductor 260 is energized and the relay R25 and the other similar relays for each of the channel scanning switches are conditioned for energization. Moreover, each time that the solenoid 237 is actuated the wipers of the scanning switches 225, 210, etc. are moved one step. It will thus be clear that these switches are stepped in synchronism with the timer control switch 249, and by providing each of the scanning switches with a number of contacts equal to the number of homes being monitored, the scanning switches are reset when the wiper of the timer control switch 249 reaches its last switching contact.

The switch 249 is preferably provided, in addition to the switching contacts, with a number of contacts which are used for providing the print order to the fast rating printer 15 and for resetting the scanning and counting switches. Therefore, as shown, when the wiper of the switch 249 engages the first contact following the switching contacts, the relay R28 is not picked up, and as a result, the wipers of the scanning switches remain in the last position. At this time, however, the wiper of the timer control switch 249 is connected through the conductor 251 to the fast rating printer 15 which is thereby energized to print the totals contained in the counters. The fast rating records are thus made while the wiper of the switch 249 dwells on the first contact following the switching contacts. This contact is called the print order contact and is designated with the number 249a in Fig. 6b.

In order to print at the end of each scanning period a record of the total number of the monitored receivers which are energized and the total number of receivers which are tuned to each of the monitored channels, the printer 15 may be a suitable printing device such as, for example, an electric typewriter, which is supplied with signals from the output conductors of the counter 233 as well as from the output conductors of the other counters which correspond to the channels or stations being monitored. The desirability of printing the tabulated information only at the end of each scanning period so as to avoid any erroneous records is obvious, and therefore, the printer 15 is only energized when a print order is supplied thereto at the end of each scanning period. To this end, a print signal is supplied from the timer control switch 249 to the printer 15 via the conductor 251 which is interconnected between the printer 15 and the print order contact 249a of the timer control switch 249. Consequently, after the respective follower units corresponding to the monitored receivers have all been scanned, the wiper of the timer control switch 249 engages the print order contact 249a thereby to supply an energizing signal of voltage to the printer 15. As a result, at this time a record is made of the information contained in the counters. After the printing operation takes place, the wiper of the timer control switch 249 moves to the next contact, which is designated as 249b and is called the reset contact, and all of the counters are reset.

As a practical matter for purposes of economy, all of the multiple contact rotary switches have the same number of contacts, and therefore, less than all of the contacts of the scanning switches 210, 225, 255, etc. are usable since the timer control switch 249 must have a print order contact and a reset order contact. Accordingly, in order to reset the scanning switches at the end of each scanning period, there is provided an additional multiple contact rotary switch 281 which is the reset switch and which is ganged for simultaneous operation with the scanning switches.

As shown, the wiper of the switch 281 is connected to the reset contact of the timer control switch 249 and all contacts but the last one, 280a, are connected through a set of normally closed contacts 282 of the actuator 237 to the conductor 260. Consequently, when the wiper of the switch 249 engages the reset contact 249b, the actuator 237 is set into a self-stepping condition until the wiper of the reset switch 281 engages the last contact 280a thereof. The conductor 260 is thus deenergized and the scanning switches are ready for the next scanning period.

In a reduction to practice it has been found desirable to provide a timer control switch 249 which has a contact dwell period which is approximately 90% of the pitch, so that in a one-minute scanning period the wiper of a fifty-two position switch rests on each contact for approximately one second, and to provide a self-stepping circuit for the scanning switches and for the switches in the counter 233 which operates at the rate of about 60 steps per second so that resetting of these switches occurs while the wiper in the timer control switch 249 dwells in the reset position.

In addition to the fast rating printer 15 the system of the present invention utilizes the recorder 18 to provide a minute-to-minute record of the operating condition of each monitored receiver. The recording medium upon which the detailed record is made by the recorder 18 may be of any suitable type such as, for example, wax tape, magnetic tape, or punched cards, but punched cards are preferred because the business machines which are used in making the final tabulations generally use punched cards.

Because of the desirability of providing information indicative of the minute-to-minute operating condition of each receiver, in order to reduce the number of punched cards which are accumulated during any given period, a card is punched only when the operating condition of each receiver is changed. If a card were to be punched for each receiver for each minute of the day, in a central office serving only fifty homes, 72,000 cards would be punched during each twenty-four hour period. On the other hand, because a card is punched only when the operating condition of each monitored receiver is changed, United States experience shows that for a fifty-home system only 1,500 cards are punched during a twenty-four hour period. Obviously, the handling, storage and tabulating operations are greatly simplified with the present system.

One particular punch recorder which operates satisfactorily in the system of the present invention is the Type 523 Summary Punch which is manufactured and made available for use by the International Business Machines Corporation. The Type 523 Summary Punch recorder can punch a card every six-tenths of a second and may be controlled by means of an external circuit, to punch a card only when the recorder is conditioned for punching by the application thereto of a punch order signal. Consequently, although intelligence in the form of electric signals may be supplied continuously to the recorder, a card is punched only if a punch order signal is given from the external circuit. Therefore, in order to cause a card to be punched only when a change is made in the receiver operating condition, the system of the present invention incorporates a circuit which supplies a punch order signal to the recorder 18 only when a change in receiver operating condition occurs. At all other times, no punch order signal is given and no card is punched.

Considering the punch order circuit in greater detail, the punch recorder 18 is provided with a pair of punch order terminals 293 and 294 which when short-circuited together cause a card to be fed through the machine and a record to be made of the information which is then supplied to the recorder 18 in the form of electric signals coupled to the intelligence terminals thereof. As shown, the terminal 294 is provided from within the recorder 18 with a positive voltage, which may be of the order of forty volts, and a punch order switch actuating unit 292 in the recorder 18 is serially connected between the terminal 293 and a set of normally closed contacts 279 on the relay R30 for periodically conditioning the recorder 18 for punching. The unit 292 connects the contacts 279 to the terminal 293 once every six-tenths of a second, and if the contacts 279 are closed at that time the terminal 293 is connected to the terminal 294 and a card is punched. On the other hand, if the contacts 279 are open at the time that the switch in the unit 292 is closed, no card is punched. Accordingly, the relay R30 is connected to be dropped out whenever a change in receiver operating condition occurs and to be picked up when no such change has occurred.

In order to cause the relay R30 to be deenergized at the commencement of a printing period for which a punch order should exist and to be energized whenever a punch order should not exist, the coil of the relay R30 is connected through a set of normally closed contacts 277 on the relay R29 and a set of normally open contacts 286 on the relay R28 between ground and a source of suitable voltage connected to the terminal 272. Therefore, when the wiper of the home identification switch 238 engages a contact corresponding to a home for which a punch order should exist, the relay R29 is energized to open the contacts 277 thereby to drop out the relay R30. Conversely, if a punch order should not exist, the relay R29 is dropped out thereby to close the contacts 277 and energize the relay R30. In addition to the punch order contacts 279, the relay R30 is provided with a set of normally open contacts 278 which are serially connected between a power supply terminal 231 and the upper end of the coil of the relay R30 so that when the relay R30 is picked up it remains in that condition until the relay R28 is dropped out when the wiper of the switch 249 moves to the next contact, at which time a set of normally closed contacts 289 on the relay R28 are closed to connect a capacitor 288 across the coil of the relay R30. The initial low impedance of the capacitor 288 as it commences to charge up causes the relay R30 to drop out. A resistor 291 is connected in parallel with the capacitor 288 to provide a suitable discharge path for the capacitor 288 when the relay R28 is again energized for controlling the punch order signal for the following home.

As shown, each time that the wipers of the television-on and channel scanning switches 225, 210, 255, etc. are in contact with a home contact, the relay R28 is picked up to condition the relay R30 for energization so that if the relay R29 is picked up the relay R30 is dropped out thereby to supply a punch order to the recorder 18. For the purpose of picking up the relay R29 only if a punch order should exist, the coil thereof is connected to be energized whenever a punch order relay for the home being checked is picked up. The punch order relay for home No. 1 is designated as relay R31 and is physically located in the follower unit No. 1.

As shown, the relay R31 is provided with a set of normally open contacts 275 which are serially connected with the coil of the home identification relay R22 between the left-hand end of the coil of relay R29 as viewed in Fig. 6 and the contact corresponding to home No. 1 on the home identification scanning switch 238. The wiper of the switch 238 is energized from a suitable source of voltage. In like manner, a set of contacts 276 on a punch order relay R32 in the follower No. 2 are serially connected with the home No. 2 identification relay R23 between the home No. 2 contact on the switch 238 and the coil of the relay R29. The punch order relays for the other follower units are similarly connected for controlling the energization of the relay R29.

At the end of each punching period during which a punch is actually made there is provided a punch completed signal in the form of a voltage of the order of 40 volts on a terminal 300 of the recorder 18, and in accordance with the present invention this voltage is coupled through a conductor 302 to pick up an erase control relay R34. The relay R34 is provided with a set of normally open contacts 303 which are serially connected through a conductor 304 to the wiper of the erase switch 258. As is described in detail in connection with Fig. 7, when the wiper of the erase switch 258 is grounded and connected to a home contact, the punch order relay in the corresponding follower unit is dropped out.

In order to prevent the punch completed voltage on the conductor 302 from carrying over to the next succeeding home at the time the wiper of the switch 258 moves to the next contact, a set of normally open contacts 301 on a relay R35 are serially connected between the conductor 302 and the coil of the relay R34. The coil of the relay may be energized through a set of normally open contacts 305 on the relay R34 so that once the relay R35 is picked up it is held in that condition until the relay R34 is picked up. If a punch order exists at the beginning of a punching period, the relay R34 is picked up. When a punch is completed and the relay R34 is picked up so as to ground the wiper of the erase switch 258, the contacts 305 are opened thereby to drop out the relay R35. The dropping out of the relay R35 opens the contacts 301 which in turn causes the relay R34 to drop out. Although the relay R34 is, therefore, picked up for but a few tenths of a second and the wiper of the erase switch 258 is grounded for the same short duration of time, this is sufficient time to permit the punch order relays to drop out.

As shown, the relay R35 is provided with a set of holding contacts 306 so that the relay R35 may be placed in a picked-up condition by the application thereto of a short pulse of energization voltage from the recorder 18 at the time the switch of the unit 292 is closed. In addition, a buffer relay R36 is provided intermediate the relay R35 and the unit 292.

For the purpose of picking up the punch order relays in the respective follower units whenever a change is made in the operating condition of the associated receivers, in accordance with the present invention variations in the current levels in the control circuits for the motors in the follower units are utilized. Moreover, the respective punch order switches are so connected that once closed they remain closed until an erase order is given from the erase switch 258 signifying that the latest change in the operating condition of the receiver has been recorded. If such a record has not been made, no erase order is given and the punch order is carried over to the next punching period for the particular home.

Briefly, as shown in Fig. 7, there is provided in each follower unit a circuit for effecting a punch order for each change in receiver operating condition and for erasing the punch orders only after a record of the corresponding change has been made. Since the punch order circuits in each follower unit are identical, only the punch order circuit of the follower unit No. 1 is described. This circuit includes the punch order relay R31 which is energized to provide a punch order signal whenever the condition of energization of the high current level relay R7 or of the television-on relay R9 (see Figs. 2a and 2b) is changed and the relay R31 remains energized until an erase order signal is coupled to the follower unit from the punch recorder 18 through the erase order switch 258 at the end of a punching period.

In accordance with the present invention, for the purpose of picking up the punch order relays when a change in receiver operating condition occurs, as shown in Fig. 7 the high level relay R7 is provided with a set of normally closed contacts 311 and a set of normally open contacts 313 in addition to those contacts which are used in controlling the operation of the follower motor as described in connection with Figs. 2a and 2b. The contacts 311 are serially connected with a current limiting resistor 314 and the coil of the punch order relay R31 across the terminals of a capacitor 316, and the contacts 313 are similarly connected in circuit with capacitor 317. As shown, the capacitors 316 and 317 are respectively connected in series with resistors 318 and 319 between a power supply terminal 320 and ground. It will thus be seen that whenever the operating condition of the relay R7 is changed, i. e., either it is picked up or dropped out, a charged capacitor, 316 or 317, is serially connected with the current limiting resistor 314 across the coil of the relay R31, whereby the relay R31 is picked up. The resistor 314 is provided for limiting the discharge time of the capacitors 316 and 317 to insure that sufficient time elapses for the relay R31 to be picked up, and the values of the resistors 318 and 319 are chosen to be relatively high so that the relay R31 cannot remain picked up solely from the current which is supplied thereto directly from the power supply terminal 320 through the one of the resistors 318 and 319 which is associated with the set of contacts 311 or 313 which is closed. Therefore, whenever the condition of energization of the relay R7 is changed, one of the capacitors 316 or 317 is discharged through the coil of the relay R31 momentarily to pick it up and close the punch order contacts 275 thereof so that during the following punching period for the particular home a punch order is supplied to the recorder 18 and a record is made of the information contained in the television-on and scanning switches 225, 210, 255, etc.

In order to keep the contacts 275 closed until the latest operating condition of the receiver is recorded, the relay R31 is provided with a set of normally open holding contacts 323 which are serially connected between the upper end of the coil of the relay R31 and a power supply terminal 324 so that once the punch order relay R31 is picked up by the pulse of current from one of the capacitors 316 or 317, it remains picked up by virtue of the current which flows from the power supply terminal 324 through the holding contacts 323, to the coil of the relay R31 and to ground. As discussed above in connection with Fig. 6, once that a punch has actually been made by the recorder 18, the punch completed conductor 302 thereof is energized which picks up the relay R34 in the erase order circuit to close the contacts 303 and thereby connect to ground the wiper of the erase switch 258. Therefore, at the end of a punching period during which a punch has actually been made, the home contact of the erase switch 258 of the home in question is grounded which by virtue of its being connected to the upper end of the coil of the relay R31 through the conductor 326 and the current limiting resistor 327 causes the relay R31 to drop out. The punch order circuit of Fig. 7 is then ready to signal the next succeeding change in operating condition of the associated receiver.

In the event of a breakdown at the sender unit such as, for example, should the switch SW3 in Figs. 2a or 2b not close, it is important that this fact be made known at the central station. Accordingly, the television-on relay R9, the condition of energization of which follows that of the low current relay R5, is provided with two sets of contacts 330 and 331 for initially energizing the punch order relay R31 whenever the condition of energization of the relay R9 is changed. As shown, the contacts 330 are normally closed and the contacts 331 are normally open so that for each change in the energization condition of the television-on relay R9 one or the other of the capacitors 334 and 335 is connected across the coil of the relay R31. A power supply terminal 336 is provided for enabling the charging of the capacitors 334 and 335 and a current limiting resistor 337 is provided for insuring that the relay R31 is picked up each time the condition of energization of the relay R9 is changed. In view of the fact that the punch order circuit incorporating the relay R9 is identical to the circuit comprising relay R7 the operation thereof is not described in detail.

Since the recorder 18 only provides a record of the operating condition of each monitored receiver at the time that the condition of operation of the receiver is changed there is provided the time signal apparatus 253 which is responsive to pulses of current supplied from the timer control switch 249 via the conductor 251 for continuously applying to the recorder 18 an electric signal indicative of the calendar time. Therefore, whenever a punch order is supplied to the punch recorder 18, there is recorded, in addition to the operating condition of the associated receiver, the calendar time at which the record is made. Since time recorders which are responsive to periodic input pulses for providing an indication of the calendar time are well known, for purposes of clarity the unit 253 has been shown in block diagram form.

In order to energize the stand-by tape recorders 19 when a failure exists in the recorder 18, there is provided a switching circuit for the tape puller motors of the stand-by recorders 19, which circuit includes a relay R39 which when picked up energizes the tape pullers in the recorders 19. Accordingly, no monitoring time is lost and no duplication of the detailed records by the recorder 18 and the individual recorders 19 is made. Considering the stand-by switching circuit in greater detail, when a failure occurs in the punch recorder for any purpose whatever a pair of conductors 350 and 351 therefrom are short-circuited together. At all other times there is no internal connection between these conductors. Consequently, as shown, in order to utilize this breakdown signal from the recorder 18 for energizing the tape pullers, the conductor 351 is connected to a power supply terminal 353 and the coil of the relay R39 is connected between the conductor 350 and ground. The motors in the tape pullers are suitably connected in parallel for energization from a pair of terminals 355 which are connected to a suitable power line. In addition, a set of normally open contacts 357 on the relay R39 is serially connected in the energization circuit of all of the tape motor pullers such that the motors are energized only when the relay R39 is picked up and this occurs only when a breakdown is effected in the recorder 18.

*Operation*

Considering now the operation of the system and apparatus, let it be assumed that the receiver in home No. 1 is deenergized and that the wipers of the television-on and channel scanning switches 225, 210, 255, etc. are respectively on the last contacts thereof. When the wiper of the timer control switch 249 is moved by the motor 270 to the first switching contact as shown in Fig. 6 the relay R28 is energized which closes the contacts 271 thereof to energize the conductor 260 from the power supplied to the terminal 272. When the conductor 260 is energized, the solenoid of the actuator 237 is energized by virtue of the fact that it is connected between ground and the conductor 260 thereby to rotate the wipers of the scanning switches and the other associated switches to the first contact position thereof. Since the first contact of each of the scanning switches is serially connected to the power supply terminal 219 through the television-on switch contacts 268 in the follower unit No. 1, none of the wipers thereof are energized. Accordingly, the counting relays associated therewith are not energized and the wipers of the counting switches are not stepped.

Let it be assumed that before the wipers of the scanning switches have returned to the first contacts thereof that the receiver in the home No. 1 has been energized. Referring to Fig. 2a or 2b, when the receiver is energized by closing the switch S4, the motor M1 is energized and rotates until the cam member 46 associated therewith closes the home position S1. If the wipers of the scanning switches reach the No. 1 contacts thereof before the switch S1 has been closed, these contacts will not be energized and the television-on counting switch will not be stepped. If, on the other hand, the switch S1 is closed prior to the time that the wipers on the scanning switches reach the No. 1 contact it may be seen that the telephone line circuit in Fig. 2a or 2b will be completed and the low current relay R5 will be picked up to complete the energization circuit for the relay R9 which will then in turn be picked up. When the relay R9 picks up, the punch order relay R31 is also picked up to close the punch order contacts 275 thereon and to cause these contacts to remain closed until they are erased by means of an erase order from the switch 258. If, then, the contacts 275 on the punch order relay R31 are closed at the time the wipers of the scanning switches reach the No. 1 contact, the set of contacts 208 are closed and the wiper of the television-on switch 225 is energized so as to pick up the relay R21. When the relay R21 picks up the contacts 231 thereof are closed which cause the relay R25 to be picked up by virtue of the fact that the conductor 260 is energized from the power supplied to the terminal 272 through the contacts 271 which are closed as long as the wiper of the switch 249 engages a switching contact. When the relay R25 is picked up, current is supplied from the power supply to the terminal 263 through the set of contacts 262 and through the solenoid of the relay R26 to step the wipers of the counting switches 265, 266, and 267 to the first position. During the same time that the wipers are in engagement with the No. 1 contact of each switch, current is supplied through the No. 1 contact 240 of the home identification switch 238 through the conductor 241 to the coil of the home identification relay R22 which picks up because the lower end thereof is now connected to ground through the contacts 275 and the coil of the relay R29. When the relay R22 picks up, the two sets of contacts thereof are closed thereby to supply to the punch recorder 18 a signal indicative of the fact that the intelligence information which is then being supplied to the recorder 18 is pertinent to the receiver in the home No. 1. Moreover, because the punch order contacts 275 are closed, the relay R29 is picked up thereby to open the contacts 277 thereof and to cause the relay R30 to be in a dropped-out condition. As shown, with the relay R30 dropped out, the set of contacts 279 thereof are closed which supplies a punch order to the recorder 18. Since the dwell time of the wiper of the switch 249 on the contacts thereof is approximately 1.15 seconds and the switch in the unit 292 is closed once every .6 second, if a punch order exists at the time that the wipers first engage the No. 1 contact a punch by the recorder 18 is assured even though the unit 292 is not synchronized with the rest of the system. In addition to the information which is supplied to the recorder 18 from the contacts of the relay R22 additional information is supplied from the contacts 230 of the television-on relay R21 which are closed because the contacts 208 are closed. Therefore, when the switch in the unit 292 is closed, a card is punched which contains the home identification information from the relay R22, the information indicative of the fact that the receiver is turned on from the relay R21 and the calendar time at which the punch is made.

Upon completion of the punching period the terminal 300 of the recorder 18 is energized which causes the relay R34 to pick up by virtue of the fact that the contacts 301 of the relay R35 are closed because prior to the end of the punching period when the switch of the unit 292 is initially closed for the particular punch, energy is supplied through the contacts 279 and through the unit 292 to the relay R36 which is picked up to supply power through its normally open contacts to the coil of the relay R35. When the relay R34 is picked up the contacts 303 thereon are closed which connects the wiper of the switch 258 to ground through the conductor 304. As best shown in Fig. 7 when the wiper of the switch 258 is connected to ground, the punch order relay R31 is dropped out.

The wiper of the timer control switch 249 is then moved to the next contact position to cause the actuator 237 to move the wipers of the scanning switches to the No. 2 contacts thereof.

Once that the switch S1 at the home No. 1 has been closed the motors M1 and M2 rotate in synchronism until the switch S2 in the home unit is closed to indicate that the shafts of both motors are positioned in accordance with the channel to which the receiver is tuned. The motors then remain in this condition until another change in receiver operating condition is made. Because, as assumed, the motor M2 in the follower unit No. 1 had not been positioned in accordance with the channel to which the associated receiver is tuned at the time that the previous punch is made for home No. 1, it may be seen that when the switch S2 is now closed the high level relay R7 in the follower unit No. 1 is picked up thereby to stop the motor M2 in the manner hereinbefore indicated and to cause the punch order relay R31 to again be picked up. The punch order relay R31 will thus remain in a picked-up condition and until it is dropped out by the signal supplied through the erase order switch 258 at the completion of the next punch. Therefore, when the wipers of the scanning switches again reach the No. 1 contact positions, the television-on relay R21 will be picked up and also one of the channel identification relays R20, etc., will pick up to indicate the particular channel to which the associated receiver is tuned. Therefore, when the punch order is given to the recorder 18 at the time the switch in the unit 292 is closed the intelligence information which is supplied to the recorder will include, in addition to the calendar time, the home identification signal from the relay R22, and the signal from the contacts 230 of the television-on relay R21, a signal indicative of the channel to which the receiver in home No. 1 is tuned. All of this information will be punched on the card and a punch completed signal will be supplied to the terminal 300 to cause the punch order relay R31 to drop out. The relay R31 now remains dropped out until another change in the operating condition of the associated receiver is made, and as long as the relay R31 remains dropped out the contacts 275 thereof are open and no punch order is given to the recorder 18 each time that the home No. 1 is checked by virtue of the wipers of the scanning switches engaging the No. 1 contacts thereof.

At the end of the scanning period when the wiper of the timer control switch 249 leaves the last switching contact and engages the print order contact, power is supplied from the wiper thereof to the conductor 251 to cause the fast rating printer to print the information contained in the counting switches and in addition to pulse the time recorder 253. After the printing signal has been supplied to the conductor 251 the wiper of the switch 249 moves to the next succeeding contact which is herein referred to as a reset contact 249b to energize the conductor 269 and thus cause resetting of the scanning switches, the erase order switch, the home identification switches and the switches in the counting units.

There is thus provided by the system of the present invention a written record from the fast rating printer 15 at the end of each minute which indicates the number of monitored receivers which are energized and the number of monitored receivers which are tuned to each channel being investigated. In addition, at the end of each minute there is provided a detailed record of the operating condition of each monitored receiver and at the end of any given period this latter information may be used by a market survey group to provide an accurate and detailed analysis of the effectiveness of a televised program.

While the invention has been described by means of particular embodiments thereof it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. In a system for monitoring the use of a wave signal receiver, the combination of sender means operatively connected to said receiver, follower means disposed at a remote location with respect to said sender means, a transmission medium interposed between said sender means and said follower means for conveying electric signals from one of said means to the other of said means, said sender means comprising a constant speed motor which is energized whenever the operating condition of said receiver is changed, said follower means comprising a constant speed motor which is energized whenever the operating condition of said receiver is changed, synchronizing means responsive to every change in operating condition of said receiver for synchronizing the operation of said motors, and means including said transmission medium for stopping both of said motors when the movable element of said sender motor is in a position corresponding to the tuning condition of said receiver.

2. In a system for monitoring the use of a wave signal receiver, the combination of sender means operatively connected to said receiver, follower means disposed at a remote location with respect to said sender means, a transmission medium interposed between said sender and means and said follower means for conveying electric signals from one of said means to the other of said means, said sender means comprising a constant speed motor which is initially energized whenever the operating condition of said receiver is changed and remains energized until the shaft thereof occupies a position corresponding to the tuning condition of said receiver, said follower means comprising a constant speed motor which is initially energized whenever the operating condition of said receiver is changed and which is adapted to be energized until the shaft of said sender motor is in a position corresponding to the tuning condition of said receiver, relay means at said sender means and at said follower means which is responsive to every change in operating condition of said receiver causing the shafts of said motors to rotate to respect indexing or home positions and simultaneously commence rotating, and means including said transmission medium for stopping the rotation of the shafts of both of said motors when the movable element of said sender motor is in a position corresponding to the tuning condition of said receiver.

3. In a system for monitoring the use of a wave signal receiver, the combination of a sender motor operatively connected to said receiver, a follower motor disposed at a remote location with respect to said sender means, a transmission medium for connecting said sender motor to said follower motor, means for causing the shafts of both motors to rotate to respective homing positions whenever a change is made in the receiver operating condition, means for causing said motors to be simultaneously energized when both motors are at the homing positions, and means for stopping both of said motors when the movable element of said sender motor is in a position corresponding to the tuning condition of said receiver.

4. The system of claim 1 wherein said transmission medium is a telephone line and said synchronizing means includes first and second switching means in said telephone line respectively located at said sender means and at said follower means for energizing the respective motors only when both of said switches are actuated, which switches are initially actuated when the movable elements of each of the respective motors are in predetermined positions.

5. In a system for providing a record of changes in operating condition of a wave signal receiver, the combination of means for initiating an electric control signal in response to a change in operating condition of said receiver, recorder means periodically responsive to said signal for recording said change, and means for terminating said electric signal only after said record has been made.

6. Apparatus for temporarily energizing a load device in response to changes in the operating condition of a wave signal receiver, comprising, first and second reactance means, means for storing electric energy in each of said reactance means, means responsive to one of said changes for coupling the energy stored in one of said reactance means to said load device and for coupling to said load device the energy stored in the other of said reactance means when the next succeeding change in receiver operating condition occurs, whereby said device is temporarily energized whenever a change in receiver operating condition occurs.

7. A system for providing a record of changes in operating condition of a wave signal receiver, comprising relay means responsive to a change in operating condition of said receiver for initiating an electric signal, recorder means periodically responsive to said signal for recording the operating condition of said receiver after the making of said change, and means for terminating said electric signal shortly after said record has been made, whereby a record is made of every change of receiver operating condition.

8. Apparatus for temporarily energizing a relay in response to changes in the operating condition of a wave signal receiver, comprising, first and second capacitors, means for charging each of said capacitors, means responsive to every change in receiver operating condition for energizing said relay with the charge stored in one of said capacitors and for coupling to said relay the charge stored in the other of said capacitors when the next succeeding change in receiver operating condition occurs, means responsive to the energization of said relay for holding said relay in a picked up condition once that it has been energized, means responsive to the picked up condition of said relay for recording the operating condition of said receiver at substantially the time that said relay is picked up and means for dropping out said relay after a record of receiver operating condition is made, whereby said relay is temporarily energized each time that a change in receiver operating condition occurs.

9. The apparatus of claim 6 wherein said load device is a relay and said reactance means are capacitors which are alternately discharged through the coil of said relay in response to successive changes in receiver operating condition.

10. Apparatus for tabulating and recording the operating conditions of a plurality of wave signal receivers, comprising, a plurality of sender means for providing electric signals each indicative of the operating condition of a respective one of said receivers, a plurality of follower means respectively responsive to said signals for providing at a location remote from said receivers information indicative of the tuning conditions of each of said receivers, scanning means for periodically sampling said information from said plurality of follower means, and totalizing means responsive to an output of said scanning means for providing at the end of each scanning period a record of the number of monitored receivers tuned during the preceding scanning period to respective ones of predetermined wave signals.

11. In a system for monitoring the listening habits of a plurality of wave signal receiver users, the combination of a central station remotely located from said receivers, a sender unit at each receiver, a telephone line circuit for coupling to said central station from said sender unit electric signals indicative of the energization condition of the associated receiver and of the station to which said receiver is tuned, a plurality of rotary scanning switches disposed at said central station, each of said switches corresponding to a different one of the stations being monitored and having coupled to different ones of its contacts those signals which are representative of the receivers tuned to the station corresponding to that switch, and means connected to said switch for totalizing the number of signals supplied thereto as the contacts of said switch are scanned.

12. In a system for monitoring the listening habits of a plurality of wave signal receiver users, the combination of a central station remotely located from said receivers, a sender unit at each receiver for coupling to said central station electric signals indicative of the energization condition of its associated receiver and of the station to which said receiver is tuned, a plurality of rotary scanning switches disposed at said central station, each of said switches corresponding to a different one of the stations being monitored and having coupled to different ones of its contacts those signals which are representative of the receivers tuned to the station corresponding to that switch, means for scanning the signals provided on the contacts of said switch, and means connected to said switch for totalizing the number of signals supplied thereto when the contacts of said switch are scanned.

13. A system for recording the listening habits of wave signal receiver users, comprising, means for translating from a plurality of receivers to a central station signals indicative of the condition of energization and the condition of tuning of each of said receivers, a recorder, means for periodically scanning said signals to supply them individually and successively to said recorder, identification means for supplying to said recorder a signal indicative of the particular receiver the operating condition of which is being simultaneously supplied to said recorder, and means included within said translating means for rendering said recorder effective to make a record for each receiver only when a change in the operating condition of said receiver has been made since the preceding record was made.

14. In a wave signal receiver auditing system, the combination of a plurality of sender units respectively disposed in the general vicinity of each of a plurality of receivers to be monitored, a central station remotely located with respect to said sender units and connected thereto by means of an electric circuit, a relay located at said central station and having the coil thereof serially connected in said electric circuit, means at said sender unit for opening said electric circuit whenever a change is made in the receiver operating condition, and means at said central station responsive to an opening of said circuit for making a record of the momentary operating condition of said receiver.

15. In a system for determining the audience response to programs broadcast from different wave signal transmitters and received by a monitored wave signal receiver capable of being selectively tuned to the signals from different ones of said transmitters, the combination of a receiver attachment, a central station remote from said receiver attachment, a telephone line circuit interconnecting said attachment and said central station, a first motor in said attachment, a second motor in said central station, switch means in said attachment serially connected in said telephone line circuit, switch means in said central station serially connected in said telephone line circuit, means responsive to a predetermined condition of said first motor for completing a portion of the telephone line circuit included within said attachment, means responsive to a predetermined condition of said second motor for completing a portion of the telephone line circuit included within said central station, and means at said attachment and at said central station for energizing said motors only when both of said portions of the telephone line circuit are completed.

16. In a system of the type described, transmitting means located at a receiver to be monitored, receiving means remotely located from said receiver, a signal translating medium interposed between said transmitting means and said recording means, motor means at said recording means to provide an indication of the tuning condition of said receiver, control means responsive to a signal from said transmitting means for stopping said motor means, means at said transmitting means for interrupting the transmission of said signal whenever the operating condition of said receiver is changed, and a recorder responsive to said control means and said motor means for providing a record of the operating condition of said receiver only upon the occurrence of a change in the operating condition of said receiver.

17. Wave signal receiver monitoring apparatus comprising, first motor means at said receiver, second motor means, synchronizing means for synchronizing the operation of said first and second motor means, means for interrupting the operation of said second motor when the movable element of said first motor means is in a position corresponding to the tuning condition of said receiver, recorder means intermittently responsive to the position of the movable element of said second motor for providing a record of the operating condition of said receiver, and means responsive to said synchronizing means for rendering said recorder means effective to record only when the operating condition of said receiver is changed.

18. In a wave signal receiver monitoring system, apparatus for translating an indication of receiver operating condition from a monitored receiver to a remote location, said apparatus comprising, a control motor at said receiver, a follower motor at said remote location, means for conditioning said control motor for operation only when said receiver is energized, means for energizing said control motor when said receiver is first energized, means for deenergizing said control motor when the movable element thereof reaches a predetermined position, means for energizing said follower motor, means for deenergizing said follower motor when the movable element thereof occupies a predetermined position, a telephone line interconnecting said remote location and the location of the monitored receiver, said telephone line circuit when completed causing the energization of said control motor and said follower motor, means at said remote location for initially opening said telephone circuit and maintaining it open until the movable element of said follower motor occupies said predetermined position, means at the location of said receiver for initially opening said telephone circuit until the movable element of said control motor occupies said predetermined position, means responsive to the tuning condition of said receiver for appreciably changing the current in said telephone circuit after said telephone circuit has been completed for a predetermined duration of time, and timing means including current operated switch means at said remote locations responsive to the current in said telephone circuit for providing at said remote location an indication of the time duration between the completion of said telephone circuit and the appreciable change in current therein, whereby an indication of wave signal receiver operating condition is rapidly translated from said receiver to said remote location.

19. In apparatus for monitoring the operating condition of a wave signal receiver of the type including a tuning element movable to tune the receiver to a selected one of a plurality of stations, the combination of a motor located in the vicinity of said receiver, said motor having a rotor, a cam controllably positioned by said rotor, and a switch adapted to be actuated by said cam, said switch being adapted to be moved along the path of movement of said cam by the movement of said tuning element so that when said switch is actuated by said cam, said rotor is in a position corresponding to the station tuned in by said receiver.

20. In apparatus for monitoring the listening habits of wave signal receiver users, the combination of a first electric motor located at a receiver to be monitored, a first control circuit for said first motor, a second electric motor remotely disposed with respect to said first motor, a second control circuit for said second motor, a telephone line interconnected between said first and second control circuits, power means for effecting an electric current in said telephone line, means for rendering said power means ineffective to provide current in said telephone line when said first and second motors are not synchronized, means responsive to the tuning condition of said receiver and operative only when said motors are synchronized for appreciably changing the current in said telephone line when the movable element of said first motor occupies a position corresponding to the tuning condition of said receiver, and switch means connected in said second control circuit, said switch means being responsive to said appreciable change in current in said telephone line for interrupting the operation of said second motor.

21. In a system for recording a change in operating conditions on a line, a recorder, current controlled switch means for rendering said recorder effective to record, a capacitor connected to be charged up when a change in the operating conditions on said line occurs, means for utilizing the charge on said capacitor for operating said switch to render said recorder effective when the next succeeding change in operating conditions occurs, and means for operating said switch to render said recorder ineffective when a record of the change in operating conditions is made, whereby an accurate record of the number of changes in receiver operating conditions is made.

22. In wave signal receiver monitoring apparatus, the combination of means for obtaining at a remote location substantially instantaneous information indicative of the operating condition of a plurality of receivers, scanning means for periodically scanning said information, totalizing and printing apparatus for recording at the end of each scanning period information indicative of the number of receivers tuned to particular stations, and recording means responsive to said scanning means for recording the operating condition of each receiver.

23. The apparatus of claim 22 wherein said recording means makes a record of the operating condition of each receiver only after a change in operating condition is made.

24. The apparatus of claim 23 wherein said printing apparatus records its information in the form of visible legends printed on a continuous tape and said recording means records its information in the form of punches in cards, an individual card being provided for each receiver operating condition which is recorded.

25. In a system for determining the radio listening or television viewing habits of users of wave signal receivers, the combination of a receiver attachment associated with a receiver to be monitored, motor means in said receiver attachment, a first cam on the shaft of said motor means, a movable contact device positionable in accordance with the tuning condition of said receiver along the circular locus of said first cam, a central station remotely located with respect to said receiver attachment, a second synchronous motor disposed at said central station, a second cam mounted on the shaft of said second synchronous motor for movement through a circular locus, a plurality of indexing contact means respectively fixed in position along the loci of said first and second cams, a signal link interconnecting said receiver attachment and said central station, a source of signals controllable in characteristic in accordance with the sequence of actuation of said movable contact device and said indexing contact devices, and signal responsive relay means which control the energy to said synchronous motors in such manner that both motors return to the indexing positions after a retune of said receiver and then proceed in phase to an angular position determined by said movable contact device whereupon both motors stop in positions which are each indicative of the tuning condition of said receiver.

26. Apparatus for use in a wave signal receiver monitoring system, comprising, a receiver attachment, including a motor, said motor having a rotatable shaft, switch actuating means on said shaft, and switch means connected in circuit with said motor for controlling the operation of said motor, said switch means being selectively positionable in the path of said actuating means in response to the station or channel tuned in by said receiver, whereby the relative position of said shaft when said switch is actuated is indicative of the tuning condition of said receiver.

27. The apparatus of claim 26 wherein a fixedly positioned indexing switch is operatively connected in the motor control circuit and is disposed in the path of said actuating means, whereby the time of energization of said motor being the closures of said indexing switch and said switch means is indicative of the tuning condition of said receiver.

28. Wave signal receiver monitoring apparatus comprising a plurality of receiver attachments, respective ones of said receiver attachments being operatively connected to receivers to be monitored, signal links interconnecting said receiver attachments with a remotely located central station, said receiver attachments supplying to the respective signal links signals indicative of the operating condition of the associated receivers, means at said central station responsive to said signals for providing other signals indicative of the operating condition of each of said receivers, scanning means for scanning said other signals periodically, and means responsive to signals from said scanning means for displaying the number of receivers tuned to certain predetermined stations.

29. The apparatus of claim 28 wherein said last named means also displays the number of receivers tuned to all stations other than said predetermined stations.

30. Monitoring apparatus of the type described, comprising means respectively located at a plurality of receivers for transmitting to a remotely located office signals indicative of the operating condition of the receivers, means at said office responsive to said signals for recording fast ratings of a selected number of transmitting stations, and means at said office responsive to said signals for recording the continuous operating condition of each of said receivers.

31. The apparatus of claim 30 wherein said last mentioned means makes an actual record of the operating condition of each receiver only once after each change of the operating condition occurs.

32. The apparatus of claim 30 wherein said fast ratings are made once each minute and said last mentioned means investigates the operating condition of each receiver once each minute.

33. Monitoring apparatus comprising means for producing a plurality of signals which are respectively indicative of the tuning condition of a plurality of conditions to be monitored, storage means, scanning means for periodically supplying said signals to said storage means, and means for periodically recording the information contained in said storage means.

34. Wave signal receiver monitoring apparatus comprising a plurality of receiver attachments, respective ones of said receiver attachments being operatively connected to receivers to be monitored, signal links interconnecting said receiver attachments with a remotely located central station, said receiver attachments supplying to the respective signal links signals indicative of the operating condition of the associated receivers, means at said central station responsive to said signals for providing other signals indicative of the operating condition of each of said receivers, scanning means for scanning said other signals periodically, and tabulating means responsive to signals from said scanning means for totalizing the number of receivers tuned to certain predetermined stations.

35. The monitoring apparatus of claim 34 wherein said tabulating means includes means for operating an automatic printer for displaying the number of receivers totalized.

References Cited in the file of this patent

UNITED STATES PATENTS

| | | |
|---|---|---|
| 2,630,365 | Rahmel | Mar. 3, 1953 |
| 2,630,366 | Rahmel | Mar. 3, 1953 |
| 2,674,512 | Bogert | Apr. 6, 1954 |

UNITED STATES PATENT OFFICE

CERTIFICATE OF CORRECTION

Patent No. 2,833,859            May 6, 1958

Henry A. Rahmel et al.

It is hereby certified that error appears in the above numbered patent requiring correction and that the said Letters Patent should read as corrected below.

Column 35, lines 7 and 8, for "conditions" read -- receivers --.

Signed and sealed this 14th day of November 1961.

(SEAL)
Attest:

ERNEST W. SWIDER            DAVID L. LADD
Attesting Officer            Commissioner of Patents
                                                                USCOMM-DC